（12) United States Patent
Zhou et al.

(10) Patent No.: US 12,254,624 B2
(45) Date of Patent: Mar. 18, 2025

(54) ARTIFICIAL INTELLIGENCE ENABLED REAGENT-FREE IMAGING HEMATOLOGY ANALYZER

(71) Applicant: The Chinese University of Hong Kong, Hong Kong (CN)

(72) Inventors: Renjie Zhou, Hong Kong (CN); Xin Shu, Hong Kong (CN); Rishikesh Pandey, Unionville, CT (US)

(73) Assignee: The Chinese University of Hong Kong, Hong Kong (CN)

( * ) Notice: Subject to any disclaimer, the term of this patent is extended or adjusted under 35 U.S.C. 154(b) by 614 days.

(21) Appl. No.: 17/547,033

(22) Filed: Dec. 9, 2021

(65) Prior Publication Data

US 2022/0180515 A1    Jun. 9, 2022

Related U.S. Application Data

(60) Provisional application No. 63/123,111, filed on Dec. 9, 2020.

(51) Int. Cl.
*G06T 7/00* (2017.01)
*G06N 3/045* (2023.01)
(Continued)

(52) U.S. Cl.
CPC .......... *G06T 7/0012* (2013.01); *G06N 3/045* (2023.01); *G06V 10/778* (2022.01); *G06V 10/94* (2022.01);
(Continued)

(58) Field of Classification Search
CPC ......... G06T 7/0012; G06T 2207/20081; G06T 2207/20084; G06T 2207/30024;
(Continued)

(56) References Cited

U.S. PATENT DOCUMENTS 10,176,363 B2 *  1/2019  El-Zehiry .............. G01N 33/49
10,203,275 B2 *  2/2019  Herzog ............... G01N 21/5907
(Continued)

OTHER PUBLICATIONS

Zhao et al., Automatic detection and classification of leukocytes using convolutional neural networks (Year: 2016).*
(Continued)

*Primary Examiner* — John B Strege
(74) *Attorney, Agent, or Firm* — Saliwanchik, Lloyd & Eisenschenk

(57) ABSTRACT

The subject invention pertains to methods and systems for classifying leukocytes using artificial intelligence called AIRFIHA (artificial-intelligence enabled reagent-free imaging hematology analyzer) that can accurately classify subpopulations of leukocytes in a label-free manner. AIRFIHA can not only subtype lymphocytes into B and T cell but is capable of sorting different types of T cells subtypes. AIRFIHA is realized through training a two-step neural network using label-free images of separated leukocytes acquired from a custom-built quantitative phase microscope. Owing to its easy operation, low cost, and strong discerning capability of complex leukocyte subpopulations, AIRFIHA is clinically translatable and can also be deployed in resource-limited settings.

28 Claims, 17 Drawing Sheets

(51) Int. Cl.
G06V 10/778 (2022.01)
G06V 10/94 (2022.01)
G06V 30/18 (2022.01)
G06V 30/19 (2022.01)

(52) U.S. Cl.
CPC .... *G06V 30/18057* (2022.01); *G06V 30/1912* (2022.01); *G06V 30/19127* (2022.01); *G06T 2207/20081* (2013.01); *G06T 2207/20084* (2013.01); *G06T 2207/30024* (2013.01)

(58) Field of Classification Search
CPC ........... G06T 2207/10056; G06T 2207/30072; G06N 3/045; G06N 3/047; G06N 3/08; G06N 20/10; G06V 10/778; G06V 10/94; G06V 30/18057; G06V 30/1912; G06V 30/19127
See application file for complete search history.

(56) References Cited

U.S. PATENT DOCUMENTS

| | | | | |
|---|---|---|---|---|
| 2017/0212033 | A1* | 7/2017 | Ozaki | G06V 20/698 |
| 2018/0322327 | A1* | 11/2018 | Smith | G06V 20/698 |
| 2022/0172024 | A1* | 6/2022 | Singh | G06N 3/045 |
| 2023/0245651 | A1* | 8/2023 | Wang | G10L 13/027 704/275 |
| 2024/0038174 | A1* | 2/2024 | Zhou | G09G 3/3258 |

OTHER PUBLICATIONS

Yu et al., Auutomatic classification of Leukocytes using Neural Network (Year: 2017).*
Ridoy et al. An Automated Approach to White Blood Cell Classification Using a Lightweight Convolutional Neural Network (Year: 2020).*
Su et al. A Neural Network Approach to White Blood Cell Classification (Year: 2014).*
Bain, B.J., "Blood Cell Morphology in Health and Disease," Dacie and Lewis Practical Haematology, 2017, pp. 61-92.
Thachil, J., et al., "Approach to the Diagnosis and Classification of Blood Cell Disorders," Dacie and Lewis Practical Haematology, 2017, pp. 497-510.
Ciccullo, A., et al., "Neutrophil-to-lymphocyte ratio and clinical outcome in COVID-19: a report from the Italian front line," International Journal of Antimicrobial Agents, 2020, 56:1-4.
Liu, J., et al., "Neutrophil-to-lymphocyte ratio predicts critical illness patients with 2019 coronavirus disease in the early stage," Journal of Translational Medicine, 2020, 18:1-12.
Meintker, L., et al., "Comparison of Automated Differential Blood Cell Counts from Abbott Sapphire, Siemens Advia 120, Beckman Coulter DxH 800, and Sysmex XE-2100 in Normal and Pathologic Samples," Am J Clin Pathol, 2013, 139:641-650.
Briggs, C., et al., "Basic Haematological Techniques," Dacie and Lewis Practical Haematology, 2017, pp. 18-49.
Suzuki, Y., et al., "Label-free chemical imaging flow cytometry by high-speed multicolor stimulated Raman scattering," PNAS, 2019, 116(32):15842-15848.
Blasi, T., et al., "Label-free cell cycle analysis for high-throughput imaging flow cytometry," Nature Communications, 2016, 7:1-9.
Ojaghi, A., et al., "Label-free hematology analysis using deep-ultraviolet microscopy," PNAS, 2020, 117(26):14779-14789.
Kobayashi, H., et al., "Label-free detection of cellular drug responses by high-throughput bright-field imaging and machine learning," Scientific Reports, 2017, 7:1-9.
Heo, Y.J., et al., "Real-time Image Processing for Microscopy-based Label-free Imaging Flow Cytometry in a Microfluidic Chip," Scientific Reports, 2017, 7:1-9.

Ramoji, A., et al., "Toward a Spectroscopic Hemogram: Raman Spectroscopic Differentiation of the Two Most Abundant Leukocytes from Peripheral Blood," Analytical Chemistry, 2012, 84:5335-5342.
Mir, M., et al., "Quantitative Phase Imaging," Progress in Optics, 2012, 57:133-217.
Park, Y., "Quantitative phase imaging in biomedicine," Nature Photonics, 2018, 12:578-589.
Popescu, G., "Quantitative Phase Imaging of Cells and Tissues," McGraw-Hill, 2011, pp. 1-384.
Popescu, G., et al., "Optical imaging of cell mass and growth dynamics," Am J Physiol Cell Physiol, 2008, 295:C538-C544.
Mir, M., et al., "Optical measurement of cycle-dependent cell growth," PNAS, 2011, 108(32):13124-13129.
Park, Y., et al., "Measurement of red blood cell mechanics during morphological changes," PNAS, 2010, 107(15):6731-6736.
Popescu, G., et al., "Erythrocyte structure and dynamics quantified by Hilbert Phase microscopy," Journal of Biomedical Optics, 2005, 10(6):1-3.
Li, Y., et al., "Quantitative investigation on morphology and intracellular transport dynamics of migrating cells," Applied Optics, 2019, 58(34):G162-G168.
Lei, C., et al., "High-throughput imaging flow cytometry by optofluidic time-stretch microscopy," Nature Protocols, 2018, 13:1603-1631, supplemental pp. 1-3.
Chen, C.L., et al., "Deep Learning in Label-free Cell Classification," Scientific Reports, 2016, 6:1-16.
Zhang, J.K., et al., "Label-free colorectal cancer screening using deep learning and spatial light interference microscopy (SLIM)," APL Photonics, 2020, 5(040805):1-8.
Jo, Y., et al., "Holographic deep learning for rapid optical screening of anthrax spores," Science Advances, 2017, 3:1-9, supplemental p. 1.
Jo, Y., et al., "Quantitative Phase Imaging and Artificial Intelligence: A Review," IEEE Journal of Selected Topics in Quantum Electronics, 2019, 25(1):1-14.
Strbkova, L., et al., "Classification of Cells in Time-Lapse Quantitative Phase Image by Supervised Machine Learning," Digital Holography and Three-Dimensional Imaging, 2019, pp. 1-2.
Lee, K.C.M., et al., "Quantitative Phase Imaging Flow Cytometry for Ultra-Large-Scale Single-Cell Biophysical Phenotyping," Cytometry Part A, 2019, 95A:510-520.
Nissim, N., et al., "Real-Time Stain-Free Classification of Cancer Cells and Blood Cells Using Interferometric Phase Microscopy and Machine Learning," Cytometry Part A, 2021, 99A:511-523.
Ozaki, Y., et al., "Label-free classification of cells based on supervised machine learning of subcellular structures," PLOS One, 2019, 14(1):1-20.
O'Connor, T., et al., "Deep learning-based cell identification and disease diagnosis using spatio-temporal cellular dynamics in compact digital holographic microscopy," Biomedical Optics Express, 2020, 11(8):4491-4508.
Kim, G., et al., "Learning-based screening of hematologic disorders using quantitative phase imaging of individual red blood cells," Biosensors and Bioelectronics, 2019, 123:69-76.
Karandikar, S.H., et al., "Reagent-Free and Rapid Assessment of T Cell Activation State Using Diffraction Phase Microscopy and Deep Learning," Analytical Chemistry, 2019, 91:3405-3411.
Yoon, J., et al., "Identification of non-activated lymphocytes using three-dimensional refractive index tomography and machine learning," Scientific Reports, 2017, 7:1-10.
Li, Y., et al., "Accurate label-free 3-part leukocyte recognition with single cell lens-free imaging flow cytometry," Computers in Biology and Medicine, 2018, 96:147-156.
Simonyan, K., et al., "Very Deep Convolutional Networks for Large-Scale Image Recognition," arXiv preprint arXiv:1409.1556 (2014).
Szagedy, C., et al., "Going Deeper with Convolutions," Proc. 2015 IEEE Conference on Computer Vision and Pattern Recognition, pp. 1-9.
He, K., et al., "Deep Residual Learning for Image Recognition," Proc. 2016 IEEE Conference on Computer Vision and Pattern Recognition, pp. 770-778.

(56) References Cited

OTHER PUBLICATIONS

He, K., et al., "Identity Mappings in Deep Residual Networks," Proc. 2016 European Conference on Computer Vision, pp. 630-645.
Svensen, M., et al., "Pattern Recognition and Machine Learning," Springer, 2006, pp. 1-101.
Grefenstette, J.J., "Genetic Algorithms and Machine Learning," Proceedings of the sixth annual conference on Computational learning theory, 1993, pp. 1-2.
Rivenson, Y., et al., "PhaseStain: the digital staining of label-free quantitative phase microscopy images using deep learning," Light: Science & Applications, 2019, 8(23):1-11.
Lee, J., et al., "Deep-Learning-Based Label-Free Segmentation of Cell Nuclei in Time-Lapse Refractive Index Tomograms," IEEE Access, 2019, 7:83449-83460.
Wang, H., et al., "Deep learning enables cross-modality super-resolution in fluorescence microscopy," Nature Methods, 2019, 16:103-110, supplemental pp. 1-9.
Nassar, M., et al., "Label-Free Identification of White Blood Cells Using Machine Learning," Cytometry Part A, 2019, 95A:836-842.
Habaza, M., et al., "Rapid 3D Refractive-Index Imaging of Live Cells in Suspension without Labeling Using Dielectrophoretic Cell Rotation," Advanced Science, 2017, 4(1600205):1-9.
Niu, M., et al., "Portable quantitative phase microscope for material metrology and biological imaging," Photonics Research, 2020, 8(7):1253-1259.
Wang, Z., et al., "Spatial light interference microscopy (SLIM)" Optics Express, 2011, 19(2):1-11.
Bhaduri, B., et al., "Diffraction phase microscopy: principles and applications in materials and life sciences," Advances in Optics and Photonics, 2014, 6:57-119.
Jin, D., et al., "Large Population Cell Characterization Using Quantitative Phase Cytometer," Cytometry Part A, 2017, 91A:450-459.
Hotelling, H., "Analysis of a Complex of Statistical Variables into Principal Components," The Journal of Educational Psychology, 1933, pp. 417-441.
Van Der Maaten, L., et al., "Visualizing Data using t-SNE," Journal of Machine Learning Research, 2008, 9:2579-2605.
Ioffe, S., et al., "Batch Normalization: Accelerating Deep Network Training by Reducing Internal Covariate Shift," Proceedings of the 32nd International Conference on Machine Learning, 2015, 37:1-9.
Nair, V., et al., "Rectified Linear Units Improve Restricted Boltzmann Machines," Proceedings of the 27th International Conference on Machine Learning, 2010, pp. 1-8.
Bridle, J.S., "Probabilistic Interpretation of Feedforward Classification Network Outputs, with Relationships to Statistical Pattern Recognition," Neurocomputing, 1990, 68:227-236.
Kingma, D.P., et al., "Adam: A Method for Stochastic Optimization," arXiv preprint arXiv:1412.6980 (2014).
Robbins, H., et al., "A Stochastic Approximation Method," The Annals of Mathematical Statistics, 1951, 22(3):400-407.
Manago, S., et al., "A reliable Raman-spectroscopy-based approach for diagnosis, classification and follow-up of B-cell acute lymphoblastic leukemia," Scientific Reports, 2016, 6:1-13.
Wu, C.-H., et al., "Imaging Cytometry of Human Leukocytes with Third Harmonic Generation Microscopy," Scientific Reports, 2016, 6:1-10.
Popescu, G., "Diffraction phase microscopy for quantifying cell structure and dynamics," Optics Letters, 2006, 31(6):775-777.
Pandey, R., et al., "Integration of diffraction phase microscopy and Raman imaging for label-free morpho-molecular assessment of live cells," Journal of Biophotonics, 2019, 12:1-8.
Barer, R., et al., "Interference Microscopy and Mass Determination," Nature, 1952, 169:366-367.
Powers, D.M.W., "Evaluation: From Precision, Recall and F-Measure to ROC, Informedness, Markedness & Correlation," Journal of Machine Learning Technologies, 2011, 2:37-63.
Saito, T., et al., "The Precision-Recall Plot Is More Informative than the ROC Plot When Evaluating Binary Classifiers on Imbalanced Datasets," PLOS One, 2015, 10(3):1-21.
Jani, I.V., et al., "Effect of point-of-care CD4 cell count tests on retention of patients and rates of antiretroviral therapy initiation in primary health clinics: an observational cohort study," Lancet, 2011, 378:1572-1579.
Boyle, D.S., et al., "Emerging technologies for point-of-care CD4 T-lymphocyte counting," Trends in Biotechnology, 2012, 30(1):45-54.
Olsson, J., et al., "Age-related change in peripheral blood T-lymphocyte subpopulations and cytomegalovirus infection in the very old: the Swedish longitudinal OCTO immune study," Mechanisms of Ageing and Development, 2000, 121:187-201.
Brown, D.C., et al., "Ontogeny of T lymphocytes and intestinal morphological characteristics in neonatal pigs at different ages in the postnatal period," J. Anim. Sci. 2006, 84:567-578.
Zheng, G., et al., "Wide-field, high-resolution Fourier ptychographic microscopy," Nature Photonics, 2013, 7:739-745, supplemental p. 1.
Li, J., et al., "PURE-LET Image Deconvolution," IEEE Transactions on Image Processing, 2018, 27(1):92-105.
Goldberg, D.E., et al., "Genetic Algorithms and Machine Learning," Machine Learning, 1988, 3:95-99.

* cited by examiner

FIG. 1A        FIG. 1B        FIG. 1C
(a) Cell Sorting    (b) Label-free Imaging    (c) Training
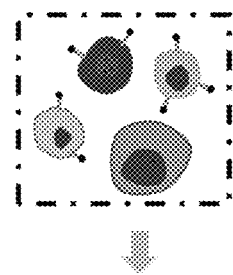
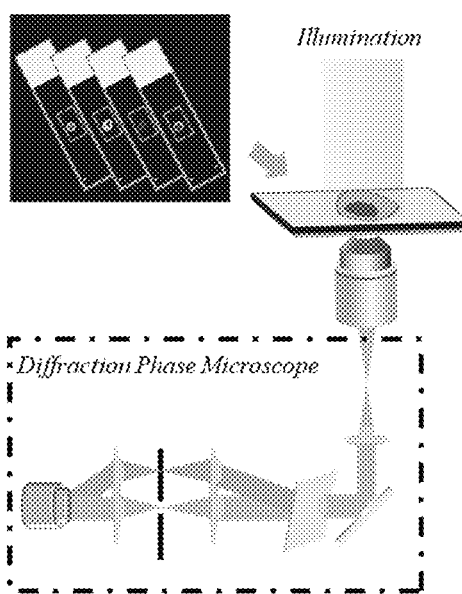
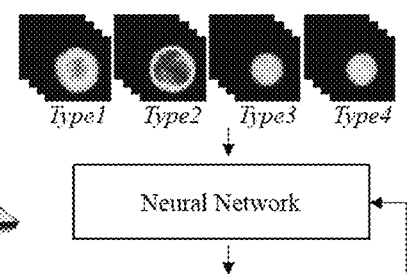
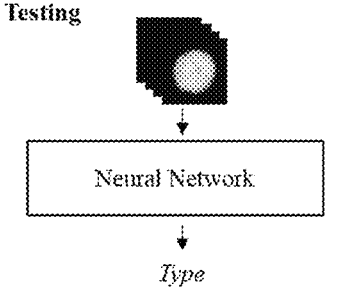
(d) Testing
FIG. 1D FIG. 2A  FIG. 2B  FIG. 2C
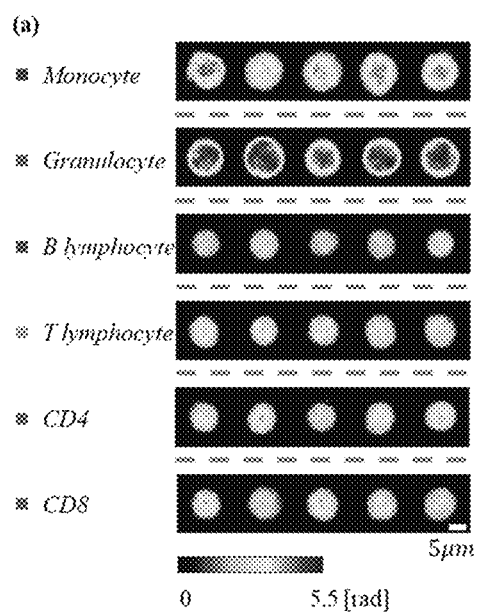
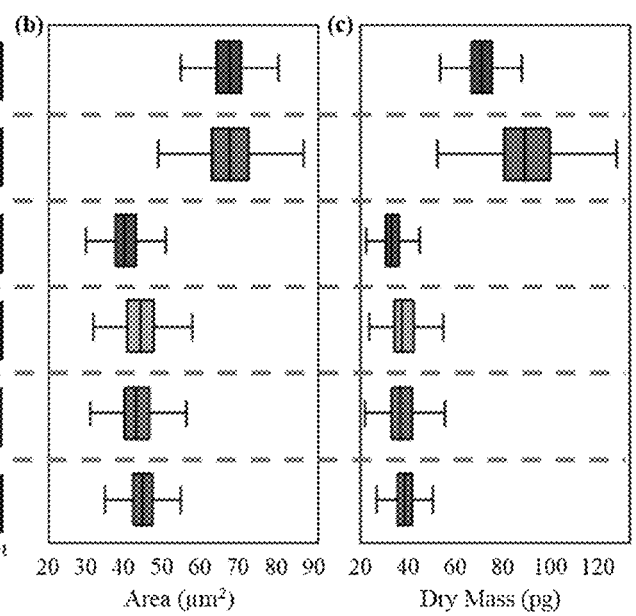

FIG. 4A
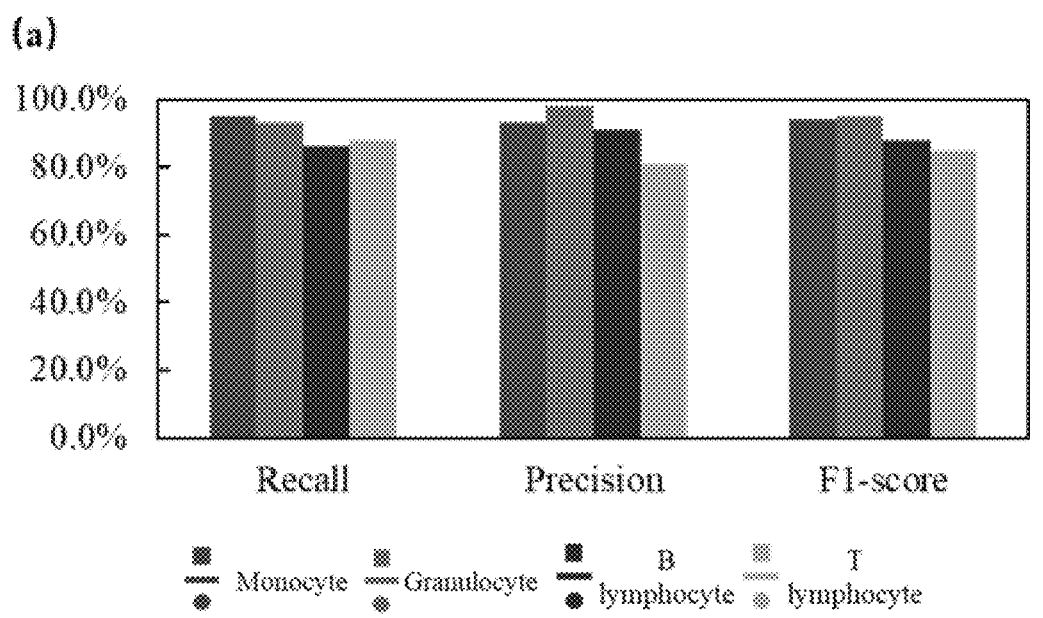
FIG. 4B
FIG. 4C
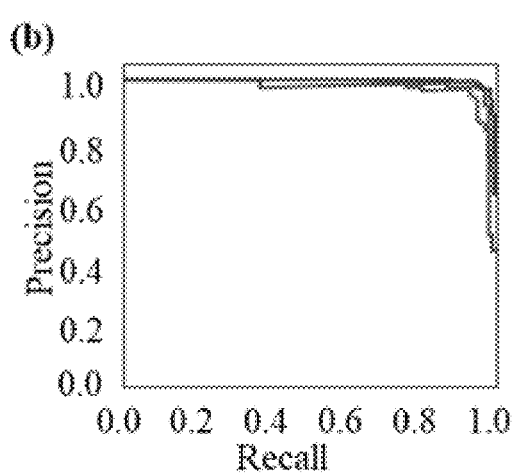
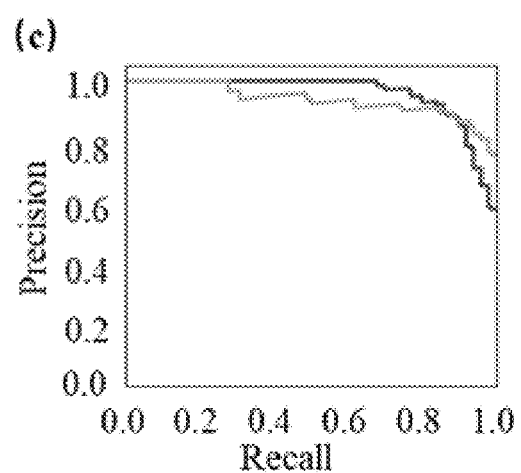
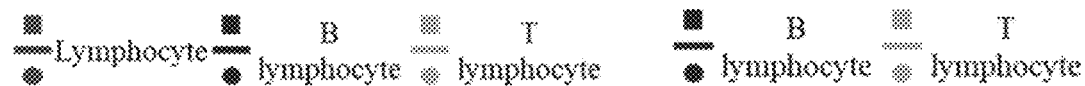

FIG. 4D
FIG. 4E
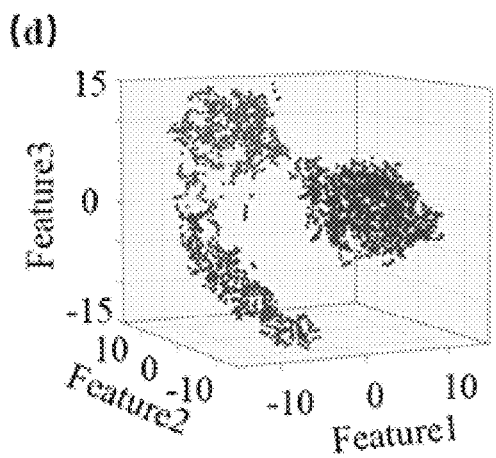
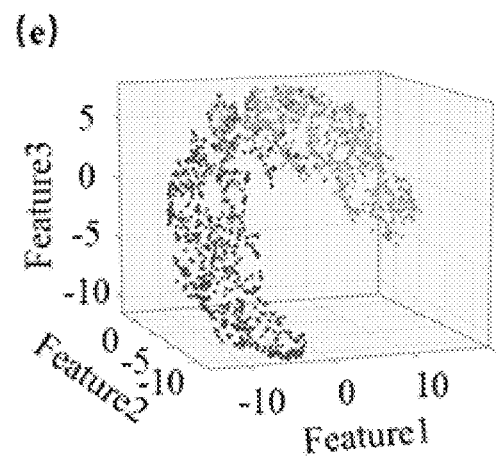
FIG. 4F
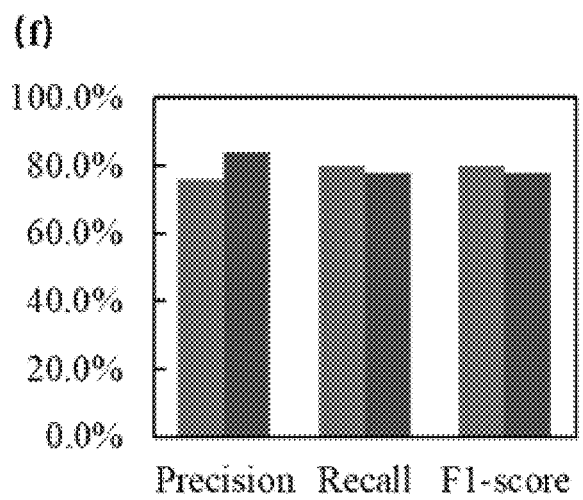

FIG. 8A    FIG. 8B    FIG. 8C
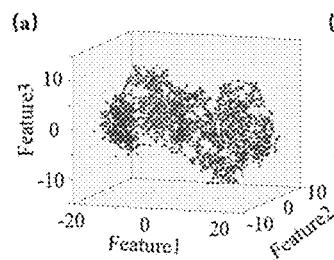 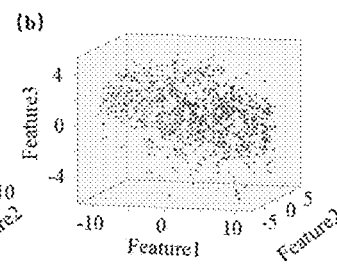 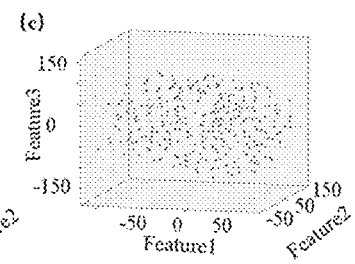
• Monocyte   • Granulocyte   • Lymphocyte   • B lymphocyte   • T lymphocyte   • CD4   • CD8
FIG. 9A
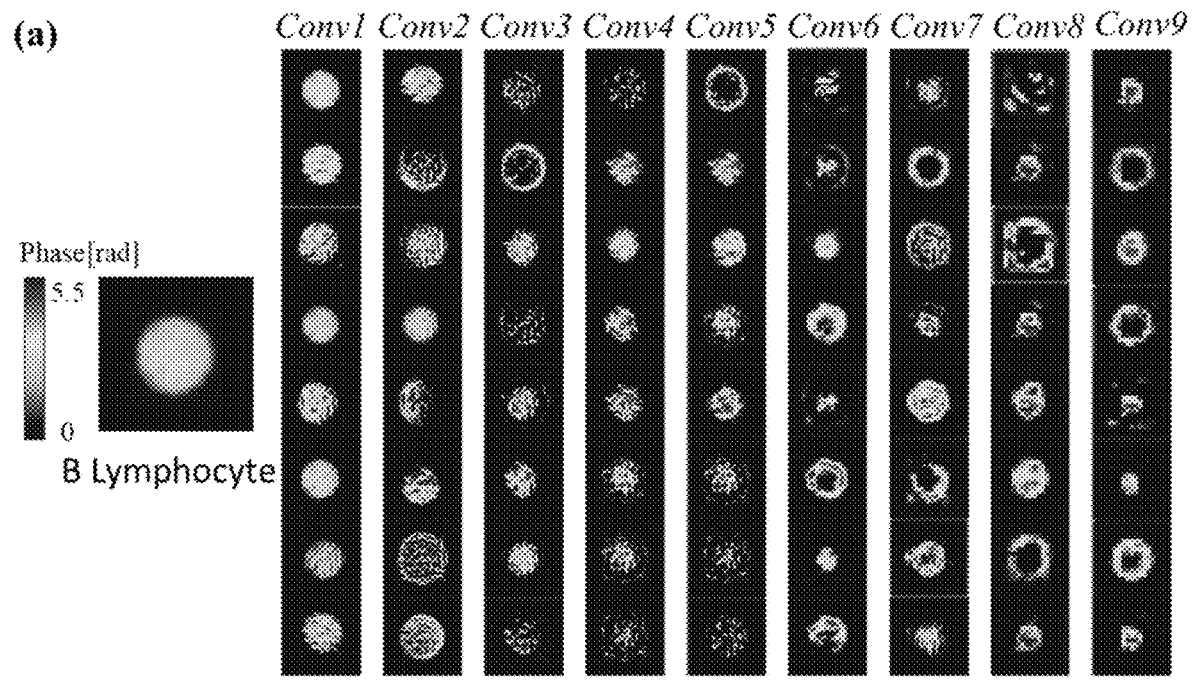

(d)  Conv9

Monocyte (a)

ARTIFICIAL INTELLIGENCE ENABLED REAGENT-FREE IMAGING HEMATOLOGY ANALYZER

CROSS-REFERENCE TO RELATED APPLICATION

This application claims the benefit of U.S. Provisional Application Ser. No. 63/123,111, filed Dec. 9, 2020, which is hereby incorporated by reference in its entirety including any tables, figures, or drawings.

BACKGROUND OF THE INVENTION

Leukocytes play an important role in maintaining the normal function of human immune systems and differ in structure and function[1,2]. For instance, B and T lymphocytes can produce antibodies to defend the body against foreign substances, such as bacteria and viruses. Abnormal leukocyte differential counts are indications of malfunctions of the immune system or infectious diseases. For instance, a sharp increase in neutrophil-to-lymphocyte ratio serves as an independent risk factor for SARS-CoV-2 infection[4,5]. To differentiate basic leukocyte types, volume and granularity parameters are often measured through electrical impedance and light scattering-based cytometry techniques[6,7]. For more complex leukocyte types with similar morphologies (e.g., B and T lymphocytes), fluorescent molecules bound with antibodies that specifically target the proteins expressed on the surface are typically used to activate fluorescence emission which can be captured by detectors for population counting. Although antibody labeling based flow cytometry methods are widely used in the clinical laboratories, there remain a few drawbacks. Firstly, only the labeled cellular structures are used for differentiating cell types, but not all the cellular structures. Secondly, an extensive list of expensive reagents is required for differentiating many cell types. Lastly, the labeled cells are not suitable for further testing as their original states have changed. Label-free imaging methods can potentially solve the aforementioned issues[8-12]. For instance, a hemogram based on Raman imaging has been proposed to discern leukocytes[13]. While this innovative approach leverages unique biochemical attributes for the classification, it is limited by the weak, spontaneous Raman signal, thus not suitable for high-throughput applications in a clinical setting. Quantitative phase microscopy (QPM) is a rapidly emerging imaging modality that is suitable for high-speed imaging of unlabeled specimens. In QPM, the exact optical path-length delay associated with the density and thickness at each point in the specimen is mapped, which has enabled label-free imaging of transparent structures (e.g., live cells) with high imaging contrast[14-16]. In recent years, QPM has been used for single-cell analysis by extracting quantitative biomarkers, e.g., measuring dry cell mass to quantify cell growth[17,18], studying red blood cell rheology[19,20], characterizing cell viability[21], analyzing large cell populations[22,23], and screening cancer[24], etc. However, most studies have primarily relied on interpreting the QPM results in terms of a few principal morphological characteristics. Recently, a shift has been sought in the paradigm by utilizing machine learning (ML) and artificial intelligence (AI) for analyzing and interpreting QPM data[25-27]. As for the applications on hematology, QPM with ML/AL has been used to screen cancer cells in blood[28-30], diagnose red blood cell related disorders[31,32], detect activation states of leukocytes[33], and classify various leukocytes[34-38]. The full field and fast imaging attributes of QPM enable availability of volumes of high-dimension imaging and therefore make QPM a unique modality for the application of ML/AI to those tasks involving cell classification and imaging. With recent developments in ML/AI, e.g., visual geometry group (VGG)[39], inception[40], and residual neural network (ResNet)[41,42] abundant training data is available to train a model to extract important image features to classify targeted objects[43,44]. Compared with previous manual feature extraction analysis methods, the new approaches in ML/AI may offer features with statistically significant higher sensitivity and specificity. Among the recent ML/AI methods, ResNet tackles the gradient vanishing problem by creating shortcut paths to jump over layers. Conversion among different types of biomedical images and the segmentation of certain cell structures have been achieved by using ResNet building blocks[45-47]. With such exciting developments, ML/AI have been applied to label-free imaging cytometry systems to tackle complicated cell analysis problems. For instance, machine learning for the differentiation of lymphocytes has been achieved on a bright-field and dark-field microscopy platform[48] and a QPM platform using fixed pathology slides[34]. To further improve the detection accuracy and specificity of leukocyte subtypes, 3D QPM techniques has been proposed and demonstrated[35,49].

Accordingly, rapid, low-cost methods of using a system to classify complex leukocyte types are needed.

BRIEF SUMMARY OF THE INVENTION

The disclosure provides a system and methods of using the system to classify leukocytes. The system to classify leukocytes can be an AI-enabled reagent-free imaging hematology analyzer (AIRFIHA) that can classify complex leukocyte types in blood samples or other samples containing leukocytes. AIRFIHA is based on leveraging the morphological attributes of phase images from a QPM system and a cascaded-ResNet for leukocyte classification. The robustness and applicability of the subject methods can be confirmed by conducting cross-donor validation experiments. The methods and system can discern human CD4 and CD8 T cells, monocytes, granulocytes, and/or lymphocytes. The subject methods and system show a promising perspective when applying automated clinical blood testing applications, which is especially useful in resource-limited settings and during pandemic situations.

BRIEF DESCRIPTION OF THE DRAWINGS

FIGS. 1A to 1D show workflow of the AIRFIHA system. FIG. 1A shows different types of leukocytes are negatively separated using antibody-labeled magnetic particles. FIG. 1B shows a diffraction phase microscope is used for obtaining quantitative phase images of sorted leukocytes. FIG. 1C shows deep learning model is trained for classifying the leukocyte types. FIG. 1D shows a trained neural-network model is used to predict leukocyte types.

FIGS. 2A to 2C show representative phase images, area, and dry mass distributions of different leukocyte types. FIG. 2A shows representative phase images for each leukocyte type. FIGS. 2B and 2C show area and dry mass distributions for all the leukocyte types in the dataset. Monocytes (red), granulocytes (green), B lymphocytes (blue), T lymphocytes (orange), CD4 cells (light blue) and CD8 cells (purple). Scalebar: 5 µm.

FIGS. 3A and 3B show the cascaded-ResNet-10 for classifying monocytes, granulocytes, and B and T lymphocytes. FIG. 3C shows the ResNet-10 for classifying CD4 and CD8 cells.

FIGS. 4A to 4H show classification results on monocytes (red), granulocytes (green), B lymphocytes (blue), T lymphocytes (orange), CD4 cells (light blue), and CD8 cells (purple). FIG. 4A shows recall, precision, and F1-score for four types of leukocytes. FIG. 4B shows precision-recall curves for the monocyte-granulocyte-lymphocyte classifier. FIG. 4C shows precision-recall curves for the B-T lymphocyte classifier. FIGS. 4D and 4E show T-SNE visualization of the feature extracted by the above two classifiers. FIG. 4F shows recall, precision, and F1-score for CD4 and CD8 cells. FIG. 4G shows precision-recall curve for the CD4-CD8 classifier. FIG. 4H shows T-SNE visualization of the feature extracted by the CD4-CD8 classifier.

FIG. 5A shows comparison of leukocyte area distributions among different donors. Monocyte (red), Granulocyte (green), B lymphocyte (blue), T lymphocyte (orange) from 6 donors are included. FIG. 5B shows comparison of leukocyte dry mass distributions among different donors. FIG. 5C shows F1-Scores of leukocyte subtypes of each test donor from the cross-donor validation experiment. F1-scores obtained earlier using all six donors subtracting 10% are drawn with black lines for comparison.

FIGS. 8A to 8C show visualization of the features extracted by PCA using the T-SNE method. FIG. 8A shows visualization of PCA features of monocytes, granulocytes, and lymphocytes. FIG. 8B shows visualization of PCA features of B and T lymphocytes. FIG. 8C shows visualization of PCA features of CD4 and CD8 cells.

FIGS. 9A-9D show visualization of the outputs from neural network layers. FIG. 9A shows neural network outputs from each convolutional layer for a B lymphocyte. FIG. 9B shows neural network outputs from the last convolutional layer for a granulocyte. FIG. 9C shows neural network outputs from the last convolutional layer for a T lymphocyte. FIG. 9D shows neural network outputs from the last convolutional layer for a monocyte.

FIG. 12A shows Anti-CD3-PE for T lymphocytes. FIG. 12B shows Anti-CD-19-APC for B lymphocytes. FIG. 12C shows Anti-CD-14-PerCP for monocytes. FIG. 12D shows Anti-CD-66b-FITC for granulocytes. FSC: forward scatter; SSC: side scatter.

DETAILED DISCLOSURE OF THE INVENTION

Figure 3A:
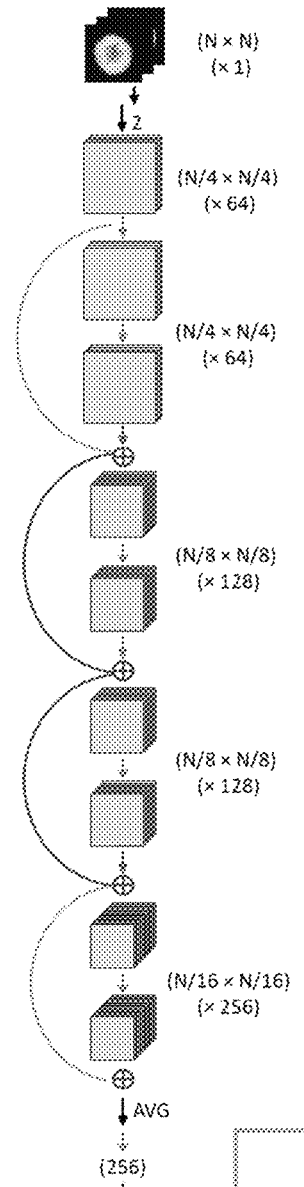
FIGS. 3A to 3C show the ResNets constructed for classification of leukocytes.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein a "reduction" means a negative alteration, and an "increase" means a positive alteration, wherein the negative or positive alteration is at least 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

In certain embodiments, a well-designed neural network model, high information-content quantitative phase images, and a considerable amount of data collected from leukocyte-containing samples, the subject methods and a system can be used to classify of granulocytes, monocytes, and B and T lymphocytes in a sample. The subject methods and system can further be used to differentiate CD4 and CD8 T cells that are normally difficult to distinguish with label-free methods.

Sample Preparation

In certain embodiments, a sample can be analyzed for the presence and/or classification of leukocytes. The sample can be blood from an organism, preferably a mammal, such as, for example, as dog, cat, human, mouse, rat, camel, lamb, sheep, cow, pig, monkey, or horse. The samples can be analyzed within about 1, about 2, about 4, about 8, about 12, about 16, about 20 or about 24 hours of blood extraction. The sample can further comprise anti-coagulants and/or preservatives, such as for example, citrate, oxalate, sodium citrate, acid-citrate-dextrose, and ethylenediaminetetraacetic acid (EDTA).

In some embodiments, the sample can be isolated leukocytes. The leukocytes can be isolated from a blood sample. Four types of leukocytes, namely monocytes, granulocytes, and B and T lymphocytes, can be isolated from fresh blood samples. To separate the leukocytes from other constituents of a blood sample, a variety of techniques known in the art can be employed such as, for example, immunomagnetic negative selection, electrokinetic mechanisms-based cell sorting, acoustophoresis-based cell sorting, optical manipulation-based cell sorting, magnetophoresis-based cell Sorting, and/or Ficoll-Paque™ density gradient separation. Negative and/or positive selection and/or other leukocyte-isolating techniques can be used to isolate each specific leukocyte type from the whole blood sample such as, for example, monocytes, granulocytes, basophils, neutrophils, eosinophils, T Cells, B Cells, CD4+ T Cells, CD8+ T Cells, helper CD4+ T cells, regulatory CD4+ T cells, memory T cells, natural killer T cells, and/or gamma delta T cells. Phosphate-buffered saline, optionally free from Ca++ and Mg++; can be used for the suspension of isolated leukocytes.

In certain embodiments, flow cytometry can be performed on the isolated leukocytes to confirm the purity of the isolation. The viability of the leukocytes can be determine using a number of techniques known in the art such as, for example, Acridine Orange and Propidium Iodide (AO/PI) staining or Trypan blue exclusion. In some embodiments, the isolated leukocytes can be counted and, once counted, can be suspended in a solution, preferably PBS, at a density of about $1 \times 10^3$ cells/mi, about $1 \times 10^4$ cells/ml, about $1 \times 10^5$ cells/ml, about $1 \times 10^6$ cells/ml, about $1 \times 10^7$ cells/ml, about $1 \times 10^8$ cells/ml, or about $1 \times 10^9$ cells/ml. To measure the cells using flow cytometry, fluorophore-conjugated antibody can be added to cells such as, for example, Anti-CD-14-PerCP for monocytes, Anti-CD-66b-FITC for granulocytes, Anti-CD-19-APC for B lymphocytes, and Anti-CD3-PE; for T lymphocytes.

In certain embodiments, leukocytes can be prepared for quantitative phase imaging. Isolated leukocytes or any other sample containing leukocytes, such as, for example, a blood sample, can be suspended, preferably in a PBS solution, and diluted at least 2-times, 3-times, 4-times, 5-times, 6-times, 7-times, 8-times, 9-times, 10-times or more. Optionally, DNase can be added to the isolated cells to decrease the clumping and adsorption of protein fragments. The isolated leukocytes can then be prepared for imaging, preferably by being sandwiched between two coverslips, preferably quartz, and a secure seal spacer. Then, the sample can be imaged, preferably by being placed onto the sample-stage for quantitative phase imaging.

Diffraction Phase Microscopy and Image Processing

Figure 6:
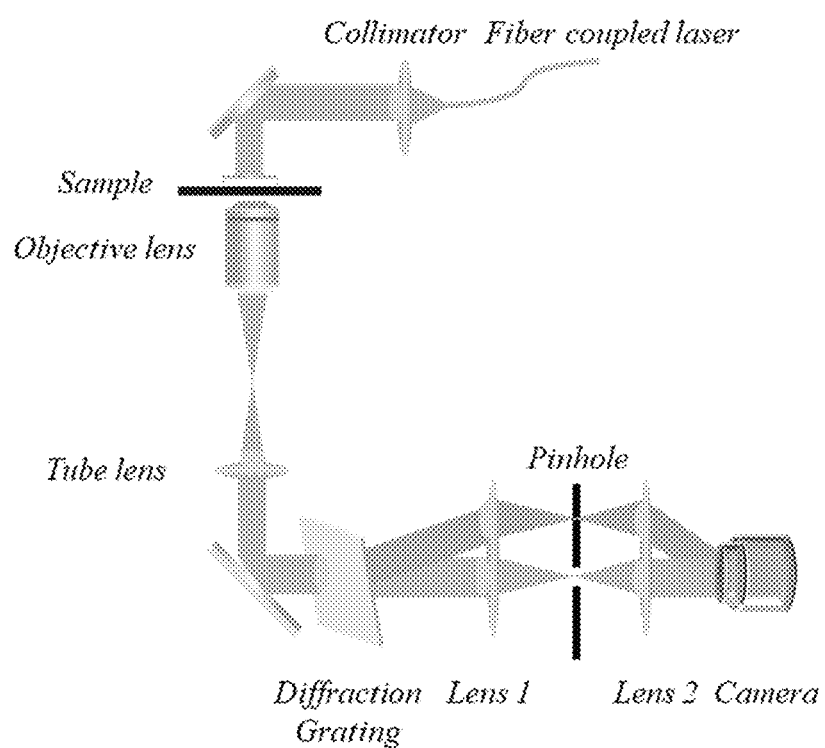
FIG. 6 shows the schematic design of the diffraction phase microscopy system.

In certain embodiments, leukocytes can be imaged using a common-path quantitative phase microscopy (QPM) (or quantitative phase imaging) method that allows for highly sensitive measurement of cell morphology with nanometer-scale sensitivity. Alternatively, bright-field microscopy, dark-field microscopy, and/or fluorescence microscopy can be used. In certain embodiments, the quantitative phase microscopy is diffraction phase microscopy (DPM), portable quantitative phase microscopy[50], spatial light interference microscopy[51], or other common-path or non-common path QPM methods. In preferred embodiments, diffraction phase microscopy is used. The result of the leukocyte imaging produces at least 1, 2, 3, 4, 5, 6, 7, 8, 9, 10, 15, 20, 25, 30, 50, 100, or more interferogram(s); however, only one interferogram is needed to obtain a wide-field phase map, high-speed image of the leukocytes. In some embodiments, the DPM system, as illustrated in FIG. 6, is used to measure the phase maps of the leukocytes. A laser can be used as the illumination source for the QPM system. The laser can have a wavelength anywhere between deep UV and NIR spectrum, preferably about 100 nm to about 2500 nm, about 100 nm to about 1000 nm, about 200 nm to about 800 nm, about 300 nm to about 700 nm, about 400 nm to about 650 nm, about 405 nm, about 532 nm, or about 633 nm. The collimated laser beam can first pass through the sample, and then the sample scattered field can then be collected by an objective lens, such as an oil immersion or, preferably, a water dipping (immersion) objective lens with numerical aperture (NA) of about 0.01 to about 10, about 0.025 to about 1.5, about 0.1 to about 1.25, about 0.12 to about 1, about 0.12 to about 0.87, about 1.33, or about 1.3. In certain embodiments, the sample beam goes through a tube lens and forms an intermediate image at its back focal plane. A diffraction grating, placed at the intermediate image plane, can produce multiple copies of the sample image. Two of the diffraction orders can be selected by a subsequent 4f system formed by lens 1 and lens 2. The $1^{st}$ order beam is filtered down to a DC beam (or reference beam) through about a 5 μm to about 50 μm or about a 10 μm diameter pinhole filter, placed at the Fourier plane of lens 1. The $0^{th}$ order beam passes the 4f system without any filtering as serves as the signal beam. At the final imaging plane after lens 2, these two beams interfere with each other and forms an interferogram which can then be captured by an imaging device, preferably a CCD/CMOS camera. The imaging system can have a total magnification of about 50× to about 200× or about 100×, a lateral resolution of about 200 nm to about 1 μm or, about 300 nm to about 800 nm, about 400 nm to about 600 nm, or preferably, about 590 nm according to the Rayleigh criterion, and a field of view of 61 μm×49 μm, or up to a field of view of about 500 μm×500 μm.

Figure 7:
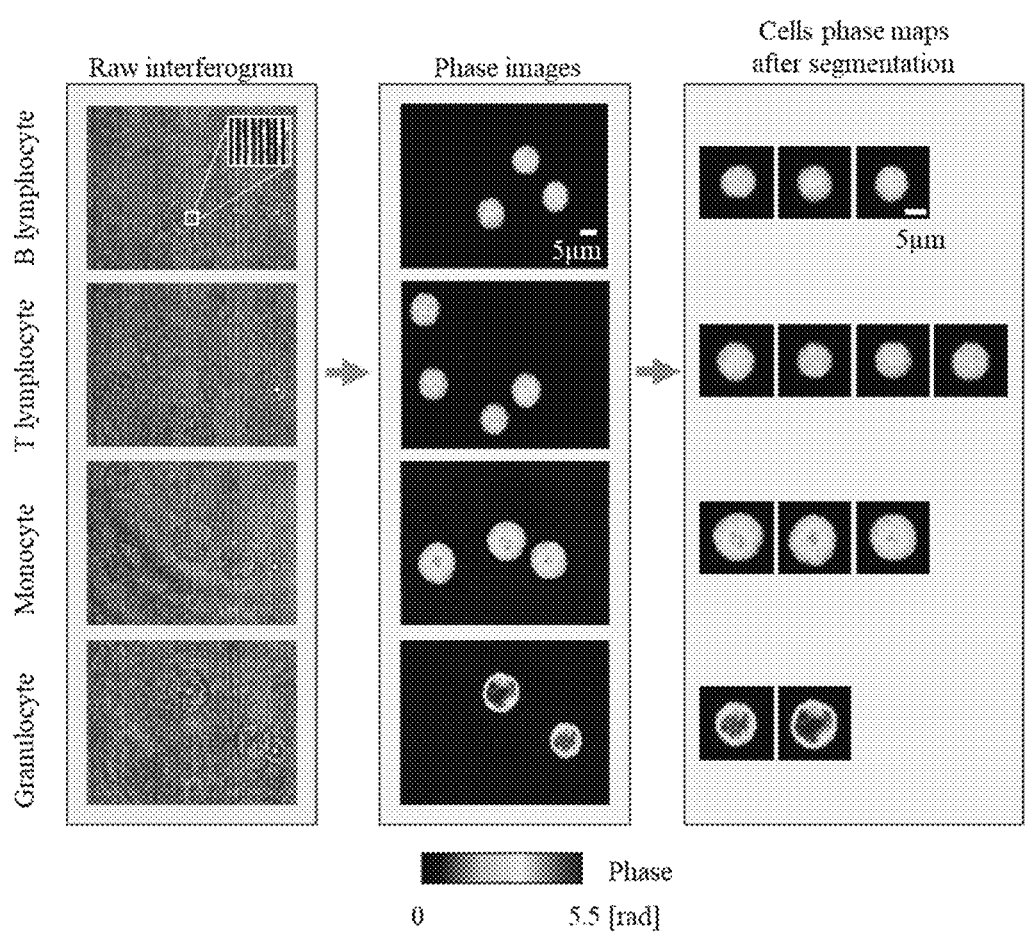
FIG. 7 shows the illustration of the quantitative phase image processing steps. The phase retrieval step is first performed over the raw interferograms (representative interferograms for each major leukocyte type are shown) to obtain the phase images. In the second step, a segmentation algorithm is used to select individual cells and create their phase maps.
Figure 9B:
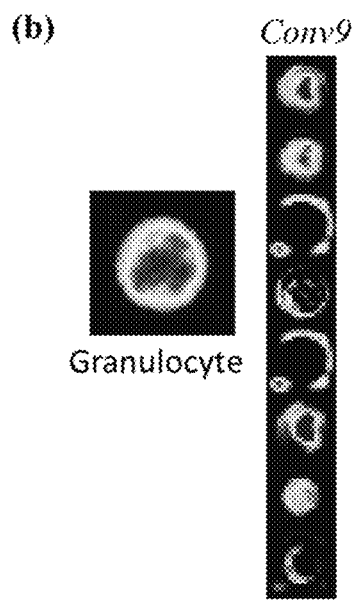
Figure 9C:
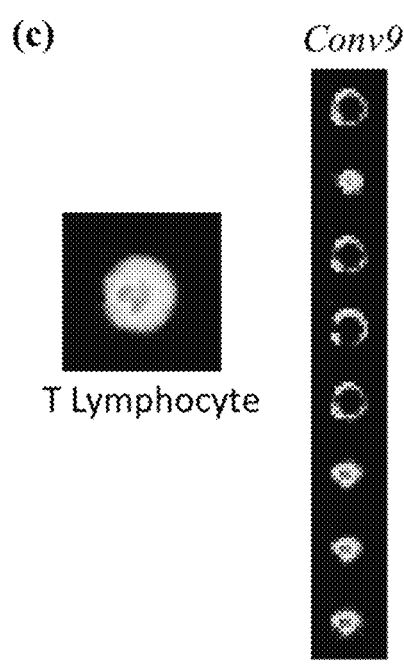
Figure 9D:
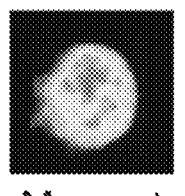
Figure 9D:

In certain embodiments, the phase image processing can comprise of phase retrieval[52] and segmentation, as shown in FIG. 7. A Fourier transform can first be performed over a raw interferogram (first column in FIG. 7), and then a bandpass filter can be used to select the +1 or −1 order signal. After that, the selected signal can be shifted back to the origin of the frequency spectrum. An inverse Fourier transform can be performed to obtain the complex sample field. Meanwhile, a separate interferogram taken in a sample-free region can be used as the calibration image and the same processing (Fourier transform, bandpass filtering, signal shift, and/or inverse Fourier transform) is conducted to obtain the complex calibration field. Then, the calibration complex field can be divided from the sample complex field to obtain the calibrated sample field, from which the sample phase map can be obtained. In certain embodiments, a phase unwrapping procedure can subsequently be added to unwrap the sample phase map. Finally, the phase map can be flattened and zeroed by removing the background tilt and subtracting the background phase value. Representative phase images for each major leukocyte type are shown in the second column in FIG. 7. After obtaining the phase images, individual cells can each be cropped with a segmentation algorithm[53] (third column in FIG. 7). First, a threshold can be set to segment cells from the background. Then, a Gaussian filter can be used with the same size as the minimum cell diameter to detect the local maxima which serves as the seeds. Third, a watershed segmentation algorithm can be used to infer the contours of cells around the seeds obtained from the last step. Lastly, the contours can be expanded and affined according to the image gradient using an edge-based active contour method. In certain embodiments, to ensure the same size for all the cell phase maps, each cell phase map can be pasted on a fixed-size template.

In certain embodiments, each leukocyte image with size of about 50×50 to about 500×500 pixels or about 300×300 pixels can be reshaped into about a 1×2500 sequence to about a 1×250000 sequence or about a 1×90000 sequence and then the principal component analysis (PCA)[54] method and/or linear discriminant analysis (LDA) can be used to decrease the dimension from 90000 to about 256 or about 2048, or more (corresponding to 10-layer resnet, 56-layer resnet, and more). In certain embodiments, the t-distributed stochastic neighbor embedding (t-SNE) method,[55] Variational Autoencoder (VAE), and/or Uniform Manifold Approximation and Projection (UMAP) can be used to visualize the PCA\LDA extracted features in a 3-D plot.

Classification Model Training

In certain embodiments at least 1, 2, 3, 4, 5, 6, 7, 8, 9, 10, or more artificial neural networks, including a residual neural network, visual geometry group, inception, AlexNet, fully connected neural network, convolutional neural network, or Generative adversarial network (GAN) can be constructed. In preferred embodiments, a neural network framework can be constructed by cascading at least 2, 3, 4, 5 or more residual neural networks (ResNets). This neural network framework can be designed to simultaneously or in series classify various types of leukocytes, specifically monocytes, granulocytes, and B and T lymphocytes using a multiple-step classification routine such as a classification routing having two classifiers. The leukocyte types in these two classifiers can be allotted in a way that each leukocyte type within one classifier share similar degrees of classification difficulties. A first ResNet can be used to classify monocytes, granulocytes, and lymphocytes. The predicted lymphocytes can then put into the second ResNet for further classification into B and T lymphocytes. Additional ResNets, for instance, one or more ResNets that classify granulocytes into neutrophils, eosinophils, basophils, mast cells, or some combination thereof, can be coupled to the two-step classification routine. Due to the similarity of these two classification tasks of the two-step classification routine, the second ResNet can be developed by fine-tuning the first ResNet. Moreover, ResNets of different depths having a plurality of layers can be used. In preferred embodiments, a 10-layer ResNet (ResNet-10) can be used that has, for example, around 1.5 million trainable parameters. The ResNet-10 may have ten layers including, for example, one input convolution layer, eight convolution layers from four building blocks (each building block has two convolution layers), and one final dense layer. Alternative ResNets that can be used include, for example, at least 2-layer, 18-layer, 20-layer, 34-layer, 56-layer, 152-layer, or more layers. A shortcut can connect the head and tail of each building block, which helps to restore the crucial shallower features for prediction. The layer size is halved, and the kernel quantity is doubled for every 1, 2, 1 building blocks. Furthermore, batch normalization (Batch Norm)[56] can be applied for each mini-batch after each convolutional layer and Rectified Linear Unit (Relu)[57] can be used as the nonlinear activation function. After the last building block, an average pool and a flatten layer can be applied to convert each two-dimensional feature map into one value. For example, for 256 feature maps, a 256×1 vector is obtained to represent each of the input images. Probabilities of each type of leukocytes are produced based on this feature vector via a dense layer with the Softmax activation function[58]. For the classification tasks, probabilities for each leukocyte type determined can be produced. For the monocyte-granulocyte-lymphocyte classification task, probabilities of these three types are produced, while for B-T lymphocyte classification, two probability values are produced. For the neutrophils, eosinophils, basophils, and mast cells classification tasks, probabilities of these four types are produced. The type with the largest probability value can be used to make the final decision. In certain embodiments, to classify CD4 and CD8 T cells, a separate ResNet can be trained by fine-tuning the B-T lymphocyte classifier for the new classification task.

In certain embodiments, phase maps of the leukocytes can be cropped from the whole phase images retrieved from the measured interferograms. Each phase image, containing one leukocyte, can then be pasted onto about a 50×50 to about 500×500 pixels or about 300×300 pixels template to be used as the input of the network. In the training process, a 2, 3, 4, 5, 6, 7, 8, 9, 10, 20, 25, 50, 100-fold cross-validation method was used to tune the hyper-parameters, including network depth, batch size, learning rate, dropout. During the training, to ensure all leukocyte types are trained under the same condition (i.e., each type has the same number of training samples), the datasets of unbalanced leukocyte types can be augmented by rotation, position shifting, and/or flipping. In certain embodiments, leukocytes can be classified as monocytes, granulocytes, or lymphocytes. In other embodiments, monocytes, granulocytes, or lymphocytes can be further distinguished. For example, B and T lymphocytes can be treated as one type, (i.e., lymphocytes) or B and T lymphocytes can be treated as distinct lymphocytes. Additionally, basophils, eosinophils, neutrophils, mast cells, natural killer cells can be treated and classified as distinct cell types. All leukocyte types, preferably granulocytes, monocytes and lymphocytes, can be used to train and test a classifier. In certain embodiments, morphological features are used during the training, including at least one selected from cell area, cell radius, cell height, cell shape, cell perimeter length, cell mass, and intracellular protein distributions. In certain embodiments, the types of leukocytes can be classified using a neural network created from donors whose leukocytes are not included in the training set. In certain embodiments, the types of leukocytes can be classified using a neural network created from donors whose leukocytes are included in the training set or from donors whose leukocytes are the only source of the training set.

In certain embodiments, after phase maps are obtained, data cleaning can be performed. To perform data cleaning, a leukocyte whose dry mass and area is more than, for example, one standard deviation, two standard deviations, or three standard deviations from the mean of its type is considered as outlier. Data cleaning can also or alternatively include removing leukocytes that are incorrectly segmented by, for example, removing cells with only half cell bodies and cell clusters. Other methods that can be used to detect the outlier include element 1.5 interquartile ranges above the upper quartile or below the lower quartile, or element more than three scaled median absolute deviation from the median. Data cleaning can occur after producing phase maps for each leukocyte and before network training.

In certain embodiments, the tuning of the neural network can be a function of at least one property of a precision-recall curve and/or F1 score representing leukocyte classifications of the known leukocytes generated by the neural network based on the digitally observed features.

In certain embodiments, to optimize the leukocyte classification models, various loss functions and various optimizers can be used. The loss functions can be based on mean squared error, likelihood loss, and/or cross-entropy loss. The various optimizers can be based on Adam, gradient descent (including stochastic gradient descent (SGD)), RMSprop, and Adagrad. In one preferred embodiment, categorical cross-entropy loss and the Adam optimizer (for example, learning rate=$1\times10^{-1}$, $1\times10^{-2}$, $1\times10^{-3}$, $1\times10^{-4}$, $1\times10^{-5}$, $1\times10^{-6}$, $1\times10^{-7}$, $1\times10^{-8}$, or $1\times10^{-9}$; $\beta_1$=0.9, 0.99, 0.999, or 0.9999; $\beta_2$=0.9, 0.99, 0.999, or 0.9999; learning rate decay=0, 0.1, 0.2, 0.3, 0.4, 0.5, 0.6, 0.7, 0.8, 0.9, or 1)[59] can be applied to optimize a leukocyte classification model. In certain embodiments, the model with the best average validation accuracy can be chosen as the final leukocyte classifier, preferably monocyte-granulocyte-lymphocyte classifier. For subsequent classifiers, such as for a B-T cell lymphocyte classifier or basophil-eosinophil-neutrophil-mast cells, the dense layer of the obtained monocyte-granulocyte-lymphocyte classifier can first be replaced with a new dense layer that has two, three, four or more outputs. In certain embodiments, the B and T lymphocytes or basophils, eosinophil, neutrophil, and mast cells can be used to fine-tune the entire network. In certain embodiments, the loss function based on categorical cross-entropy loss and the SGD optimizer (for example, learning rate=$1\times10^{-1}$, $1\times10^{-2}$, $1\times10^{-3}$, $1\times10^{-4}$, $1\times10^{-5}$, $1\times10^{-6}$, $1\times10^{-7}$, $1\times10^{-8}$, or $1\times10^{-9}$; learning rate decay=$1\times10^{-1}$, $1\times10^{-2}$, $1\times10^{-3}$, $1\times10^{-4}$, $1\times10^{-5}$, $1\times10^{-6}$, $1\times10^{-7}$, $1\times10^{-8}$, or $1\times10^{-9}$; momentum=0, 0.1, 0.2, 0.3, 0.4, 0.5, 0.6, 0.7, 0.8, 0.9, or 1)[60] can be used. The network model with the best validation result can be chosen as the final B-T lymphocyte classifier. In certain embodiments, 2, 3, 4, 5, or more network models can be used to obtain the final cascaded network model. These frameworks can be implemented with Tensorflow backend Keras framework and Python running on the Microsoft Windows 10 operating system, or other suitable operating systems, software libraries, and programming languages operating on various processors for the subject system and methods. In some embodiments, the observed features and/or morphologies of leukocytes can be stored in a database. Additionally, known leukocytes morphological features can also be stored in the same database or another database. The operating system/processor can use the databases to train and tune a neural network in addition to classifying samples containing leukocytes.

Applications

The subject methods can be used as a fully automated, reagent-free, and high-throughput modality for differential diagnosis of leukocytes at point-of-care and in a clinical laboratory. Additional salient features of this platform include its single-shot measurement, small spatial footprint, and low cost. Of note, owing to its facile and simpler set-up, this platform can be combined with other modalities for blood cell investigation. For example, by combining it with microfluidic devices, the subject system and methods can conduct blood testing and analysis in a fully automated way. Importantly, the need for isolation kits is obviated and the leucocytes separated from blood using a routine centrifugation process can be directly subjected to the subject system and methods to provide percentage population of leukocyte subtypes. Another example can be its integration with Raman spectroscopy that has been proposed for B lymphocyte acute lymphoblastic leukemia identification and classification[61]. While Raman spectroscopy provides biomolecular specificity, spontaneous Raman measurements are not feasible for clinical workflow requiring rapid diagnosis. Importantly, given the potential of the subject system and methods in screening B cells from other leucocytes, this QPM-based strategy can be used to screen the B lymphocytes in which Raman measurements can be performed for B lymphocytes leukemia diagnosis. The combined QPM-Raman system obviates the need of any additional separation method to select B lymphocytes either from the blood or from the leucocyte mixtures for leukemia diagnosis in a label-free manner. Moreover, as the subject system and methods involve a low-cost system that requires minimal sample preparation or chemical consumables, the subject system and methods have great potential for their use in point-of-care applications, resource-limited settings, or pandemic situations, e.g., COVID-19 pandemic, in view of a portable and low-cost QPM system that we recently demonstrated[62].

Materials and Methods

Fresh blood sample procurement. The fresh blood samples from six anonymous healthy adult donors were purchased from StemCell Technologies (Vancouver, Canada) and all the experiments were conducted within 24 hours of blood extraction. The purchased blood samples contained ethylenediaminetetraacetic acid (EDTA) as the anti-coagulant.

Leukocyte isolation from fresh blood. Four types of leukocytes, namely monocytes, granulocytes, and B and T lymphocytes, were isolated from fresh blood samples using isolation kits from Stemcell Technologies (Vancouver, Canada). From each donor the amount of blood was in the 1-3 ml range, depending on the minimum volume requirement as per manufacturer's instruction for each leukocyte subpopulation. To isolate these four subpopulations, we used EasySep Direct Human Monocyte Isolation Kit, EasySep Direct Human Pan-Granulocyte Isolation Kit, EasySep Direct Human T Cell Isolation Kit, and EasySep Direct Human B Cell Isolation Kit (Stemcell Technologies Inc). These separation kits used immunomagnetic negative selection for isolating each specific leukocyte type from the whole blood sample. Two additional negative separation kits, i.e., EasySep Direct Human CD4+ T Cell Isolation Kit and EasySep Direct Human CD8+ T Cell Isolation Kit, were used for the isolation of CD4 and CD8 cells, respectively. Phosphate-buffered saline free from Ca++ and Mg++ (Gibco, Thermo Fisher Scientific, Waltham, MA) was used as the recommended medium for the EasySep Isolation kits. The isolation was carried out following the manufacturer's instructions with multiple cycles of mixing and incubation with the provided RapidSpheres and cocktail from the isolation kits. The final incubation yielded the isolated leukocytes in a 14 ml polystyrene round-bottom tube (Thermo Fischer Scientific), which were centrifuged at 400 g for 5 minutes. The cell pellet was resuspended in PBS before the cells were imaged.

Flow cytometry analysis. Flow cytometry was performed on the isolated leukocytes after the EasySep procedure to confirm the purity of the isolation. The viability of the leukocytes was checked with Acridine Orange and Propidium Iodide (AO/PI) staining (Invitrogen, Thermo Fischer Scientific) using a cell counter. The isolated leukocytes were counted and 50,000 of them were resuspended in cold PBS (Gibco, Thermo Fisher Scientific) at a density of 107 leukocytes/ml. 100 ml of this cell suspension was added to each well in a 96 well plate. 1 μl of the required fluorophore-conjugated antibody was added to each well and incubated in the refrigerator for 20 mins. Anti-CD-14-PerCP was used for monocytes, Anti-CD-66b-FITC was used for granulocytes, Anti-CD-19-APC was used for B lymphocytes, and Anti-CD3-PE was used for T lymphocytes. The leukocytes were washed thrice with cold PBS and resuspended in 100 μl of cold PBS. The leukocytes were used for the flow cytometry analysis (MACSQuant Analyzer) and the data were analyzed with FlowJo software.

Leukocyte sample preparation for quantitative phase imaging. After the isolation of the leukocytes, the leukocytes are suspended PBS solution and diluted five to ten times. DNase solution (1 mg/ml) (Stemcell Technologies, Inc.) was added to the isolated cells to decrease the clumping and adsorption of protein fragments. Typically, 10 μl of the isolated cell suspension was sandwiched between two quartz coverslips and a secure seal spacer. Then, the sample was placed onto the sample-stage of the home-built system for quantitative phase imaging. We repeated this sample preparation procedure for collecting all the required phase images of leukocytes from each donor.

Training of the classification model. Phase maps of the leukocytes were obtained by cropping the phase images retrieved from the measured interferograms. Each phase map, containing one leukocyte type, was then resized to 300×300 pixels to be used as the input of the network. In the training process, a 5-fold cross-validation method was used to tune the hyper-parameters, including network depth, batch size, etc. During the training, to ensure all leukocyte types were trained under the same condition (i.e., each type has the same number of training samples), the datasets of unbalanced leukocyte types were augmented by rotation, position shifting, and flipping of the phase maps. For the monocyte-granulocyte-lymphocyte classifier, B and T lymphocytes were treated as one type, i.e., lymphocytes, and then all granulocytes, monocytes and lymphocytes were used to train and test the classifier. The loss function based on categorical cross-entropy loss and the Adam optimizer (for example, learning rate=$1\times10^{-3}$, $\beta_1$=0.9, $\beta_2$=0.999, learning rate decay=0)[59] were applied to optimize the model. In the end, the model with the best average validation accuracy was chosen as the final monocyte-granulocyte-lymphocyte classifier. For the B-T lymphocyte classifier, the dense layer of the obtained monocyte-granulocyte-lymphocyte classifier was first replaced with a new dense layer that has two outputs. All the B and T lymphocytes were used to fine-tune the entire network. The loss function based on categorical cross-entropy loss and the SGD optimizer (for example, learning rate=$1\times10^{-3}$, learning rate decay=$1\times10^{-6}$, momentum=0.9)[60] were used. The network model with the best validation result was chosen as the final B-T lymphocyte classifier. By connecting these two network models, the final cascaded network model was obtained, from which the testing was conducted. The CD4-CD8 classifier was fine-tuned from the B-T lymphocyte classifier and trained and tested within the same donor. These frameworks were implemented with Tensorflow backend Keras framework and Python running on the Microsoft Windows 10 operating system. The training was performed on a computer workstation, configured with an Intel i9-7900×CPU, 128 GB of RAM, and a Nvidia Titan XP GPU.

Diffraction Phase Microscopy System

Diffraction phase microscopy (DPM) is a common-path quantitative phase microscopy (QPM) method that allows for highly sensitive measurement of cell morphology with nanometer-scale sensitivity[52]. As only one interferogram is needed to obtain a wide-field phase map, high-speed image acquisition is possible with DPM. We have recently developed a portable DPM system with a low-cost to enable a broader adoption[63]. The DPM system, as illustrated in FIG. 6, is used to measure the phase maps of the leukocytes. A 532 nm laser (Gem 532, Laser Quantum) is used as the illumination source for the system. The collimated laser beam first passes through the sample, and then the sample scattered field is collected by a water dipping objective lens with numerical aperture (NA) of 1.1 (LUMFLN60W, Olympus). After that, the sample beam goes through a tube lens and forms an intermediate image at its back focal plane. A diffraction grating, placed at the intermediate image plane, produces multiple copies of the sample image. Two of the diffraction orders are selected by a subsequential 4f system formed by lens 1 and lens 2. The $1^{st}$ order beam is filtered down to a DC beam (or reference beam) through a 10 μm diameter pinhole filter, placed at the Fourier plane of lens 1. The $0^{th}$ order beam passes the 4f system without any filtering as serves as the signal beam. At the final imaging plane after lens 2, these two beams interfere with each other and form an interferogram which is then captured by a USB camera (FL3-U3-13Y3M-C, Pointgrey). The imaging system has a total magnification of around 100, a lateral resolution of around 590 nm according to the Rayleigh criterion, and a field of view of 61 μm×49 μm.

Quantitative Phase Image Processing

The phase image processing mainly consists of phase retrieval[52] and segmentation, as shown in FIG. 7. A Fourier transform is first performed over the raw interferogram (first column in FIG. 7), and then a bandpass filter is used to select the +1 or −1 order signal. After that, the selected signal is shifted back to the origin of the frequency spectrum. An inverse Fourier transform is performed to obtain the complex sample field. Meanwhile, another interferogram taken in the sample-free region is used as the calibration image and the same processing is conducted to obtain the complex calibration field. Then the calibration complex field is divided from the sample complex field to obtain the calibrated sample field, from which the sample phase map is obtained. Subsequently, a phase unwrapping procedure is added to unwrap the sample phase map. Finally, we flatten and zero the phase map by removing the background tilt and subtracting the background phase value. Representative phase images for each major leukocyte type are shown in the second column in FIG. 7. After obtaining the phase images, we select each individual cells with a segmentation algorithm[53] and create cell phase maps (third column in FIG. 7). To ensure the same size for all the cell phase maps, we paste each cell phase map on a fixed-size template.

Principal Component Analysis (PCA)

We first reshape each image with size of 300×300 into a 1×90000 sequence and then use the principal component analysis (PCA)[54] method to decrease the dimension from 90000 to 256. At last, by using the t-distributed stochastic neighbor embedding (t-SNE) method[55], we visualize the PCA extracted features in a 3-D plot.

To evaluate the differentiation capability of PCA, we used a support vector machine (SVM) to analyze the features extracted by PCA. We compared the differentiation accuracy between PCA and our neural network model with results presented in Table 7.

TABLE 1

Comparison between single-step classifier and cascaded classifier on donor 2

| Experiment | B cell (F1-score) | T cell (F1-score) | Monocyte (F1-score) | Granulocyte (F1-score) |
|---|---|---|---|---|
| Single-step classifier | 81.3% | 78.8% | 88.8% | 92.8% |
| Cascaded classifier | 80.9% | 81.2% | 90.2% | 92.5% |

TABLE 2

Comparison between single-step classifier and cascaded classifier on donor 3

| Experiment | B cell (F1-score) | T cell (F1-score) | Monocyte (F1-score) | Granulocyte (F1-score) |
|---|---|---|---|---|
| Single-step Classifier | 74.7% | 56.4% | 87.0% | 83.7% |
| Cascaded classifier | 75.3% | 68.5% | 94.5% | 96.0% |

TABLE 3

Classification result from the monocyte-granulocyte-lymphocyte classifier

| | | Predicted type | | | F1-score |
|---|---|---|---|---|---|
| | | Lymphocyte | Monocyte | Granulocyte | Recall | |
| Label type | Lymphocyte | 197 | 2 | 1 | 98.5% | 97.7% |
| | Monocyte | 4 | 95 | 1 | 95.6% | 94.0% |
| | Granulocyte | 2 | 5 | 93 | 93.0% | 95.4% |
| Precision | | 97.0% | 93.1% | 97.9% | Accuracy | 96.3% |

TABLE 4

Classification result from the B-T lymphocyte classifier

| | | Predicted type | | Recall | F1-score |
|---|---|---|---|---|---|
| | | B lymphocyte | T lymphocyte | | |
| Label type | B lymphocyte | 86 | 14 | 86.0% | 88.2% |
| | T lymphocyte | 9 | 91 | 91.0% | 88.8% |
| Precision | | 90.5% | 86.7% | Accuracy | 88.5% |

TABLE 5

Summarized classification result from the cascaded-ResNet

| | | Predicted type | | | | Recall | F1-score |
|---|---|---|---|---|---|---|---|
| | | Monocyte | Granulocyte | B lymphocyte | T lymphocyte | | |
| Label type | Monocyte | 86 | 14 | 0 | 0 | 86.0% | 88.2% |
| | Granulocyte | 9 | 88 | 2 | 1 | 88.0% | 84.6% |
| | B lymphocyte | 0 | 4 | 95 | 1 | 95.0% | 94.0% |
| | T lymphocyte | 0 | 2 | 5 | 93 | 93.0% | 95.4% |
| Precision | | 90.5% | 81.5% | 93.1% | 97.9% | Accuracy | 90.5% |

TABLE 6

Classification result from the CD4-CD8 classifier from one donor

| | | Predicted type | | Recall | F1-score |
|---|---|---|---|---|---|
| | | CD4 | CD8 | | |
| Label type | CD4 | 37 | 6 | 86.0% | 80.4% |
| | CD8 | 12 | 31 | 72.1% | 77.5% |
| Precision | | 75.5% | 83.8% | Accuracy | 79.1% |

TABLE 7

Classification accuracy comparison between PCA and neural network

| Experiment | B lymphocyte (F1-score) | T lymphocyte (F1-score) | Monocyte (F1-score) | Granulocyte (F1-score) |
|---|---|---|---|---|
| PCA | 70.1% | 68.2% | 89.8% | 91.5% |
| Neural Network | 88.2% | 84.6% | 94.0% | 95.4% |

TABLE 8

Cross-donor testing result with cascaded-ResNet

| Test donor | B lymphocyte (F1-score) | T lymphocyte (F1-score) | Monocyte (F1-score) | Granulocyte (F1-score) |
|---|---|---|---|---|
| 1 | N/A | 82.5% | 94.4% | 97.5% |
| 2 | 80.9% | 81.2% | 90.2% | 92.5% |
| 3 | 75.3% | 68.5% | 94.5% | 96.0% |
| 4 | N/A | 81.3% | 87.8% | 90.9% |
| 5 | 94.9% | N/A | N/A | N/A |
| 6 | N/A | 93.5% | 91.3% | 94.6% |

*N/A represents when such data is unavailable, or the dataset is too small to have a statistical significance.

TABLE 9

Cross-donor testing result from the monocyte-granulocyte-lymphocyte classifier

| Test donor | Lymphocyte (F1-score) | Monocyte (F1-score) | Granulocyte (F1-score) |
|---|---|---|---|
| 1 | 96.8% | 94.4% | 97.5% |
| 2 | 98.2% | 90.2% | 92.5% |
| 3 | 97.4% | 94.5% | 96.0% |
| 4 | 90.0% | 87.8% | 90.9% |
| 5 | 99.9% | N/A | N/A |
| 6 | 96.0% | 91.3% | 94.6% |

*N/A represents when such data is unavailable, or the dataset is too small to have a statistical significance.

TABLE 10

Cross-donor testing result from the B-T lymphocyte classifier

| Test donor | B lymphocyte (F1-score) | T lymphocyte (F1-score) |
|---|---|---|
| 1 | N/A | 85.5% |
| 2 | 81.7% | 82.9% |
| 3 | 75.9% | 71.5% |
| 4 | N/A | 92.0% |
| 5 | 94.9% | N/A |
| 6 | N/A | 97.6% |

*N/A represents when such data is unavailable, or the dataset is too small to have a statistical significance.

TABLE 11

Intra-donor testing result

| Test donor | B lymphocyte (F1-score) | T lymphocyte (F1-score) | Monocyte (F1-score) | Granulocyte (F1-score) |
|---|---|---|---|---|
| 1 | N/A | 100% | 100% | 100% |
| 2 | 90.3% | 93.1% | 93.5% | 96.6% |
| 3 | 76.1% | 68.0% | 96.7% | 98.3% |
| 4 | N/A | 88.1% | 85.7% | 96.6% |
| 5 | N/A | N/A | N/A | N/A |
| 6 | N/A | 96.7% | 93.3% | 96.7% |
| Average | 83.2% | 89.2% | 93.8% | 97.6% |

*N/A represents when such data or the dataset is too is unavailable, small to have a statistical significance.

TABLE 12

Classification result from the monocyte-granulocyte-lymphocyte classifier after data cleaning

| | | Predicted type | | | | F1-score |
|---|---|---|---|---|---|---|
| | | Lymphocyte | Monocyte | Granulocyte | Recall | |
| Label type | Lymphocyte | 196 | 4 | 0 | 98.0% | 97.7% |
| | Monocyte | 3 | 96 | 1 | 96.0% | 94.0% |
| | Granulocyte | 2 | 3 | 95 | 95.0% | 95.4% |
| Precision | | 97.5% | 93.2% | 99.0% | Accuracy | 96.8% |

TABLE 13

Classification result from the B-T lymphocyte classifier after data cleaning

|  |  | Predicted type | | Recall | F1-score |
|---|---|---|---|---|---|
|  |  | B lymphocyte | T lymphocyte | | |
| Label type | B lymphocyte | 95 | 5 | 95.0% | 91.8% |
|  | T lymphocyte | 12 | 88 | 88.0% | 91.2% |
| Precision |  | 88.8% | 94.6% | Accuracy | 91.5% |

TABLE 14

Summarized classification result from the cascaded-ResNet after data cleaning

|  |  | Predicted type | | | | | |
|---|---|---|---|---|---|---|---|
|  |  | B lymphocyte | T lymphocyte | Monocyte | Granulocyte | Recall | F1-score |
| Label type | B lymphocyte | 95 | 5 | 0 | 0 | 95.0% | 91.8% |
|  | T lymphocyte | 12 | 84 | 4 | 0 | 84.0% | 86.6% |
|  | Monocyte | 0 | 3 | 96 | 1 | 96.0% | 94.6% |
|  | Granulocyte | 0 | 3 | 3 | 95 | 95.0% | 96.9% |
| Precision |  | 88.8% | 89.4% | 93.2% | 99.0% | Accuracy | 92.5% |

TABLE 15

Intra-donor testing result

| Test donor | B lymphocyte (F1-score) | T lymphocyte (F1-score) | Monocyte (F1-score) | Granulocyte (F1-score) |
|---|---|---|---|---|
| 1 | N/A | 98.3% | 98.3% | 100% |
| 2 | 91.8% | 90.3% | 89.7% | 94.9% |
| 3 | 85.7% | 78.6% | 95.1% | 96.7% |
| 4 | N/A | 94.9% | 95.2% | 96.6% |
| 5 | N/A | N/A | N/A | N/A |
| 6 | N/A | 100% | 96.8% | 96.6% |
| Average | 88.8% | 92.4% | 95.0% | 97.0% |

TABLE 16

Cross-donor testing result with cascaded-ResNet after data cleaning

| Test donor | B lymphocyte (F1-score) | T lymphocyte (F1-score) | Monocyte (F1-score) | Granulocyte (F1-score) |
|---|---|---|---|---|
| 1 | NA* | 83.7% | 97.1% | 98.2% |
| 2 | 82.5% | 83.1% | 91.6% | 92.6% |
| 3 | 83.2% | 71.1% | 96.5% | 97.2% |
| 4 | NA | 88.1% | 93.2% | 93.8% |
| 5 | 91.7% | NA | NA | NA |
| 6 | NA | 96.6% | 96.7% | 97.6% |
| Average | 85.8% | 84.5% | 95.0% | 95.9% |

*N/A represents when such data is unavailable, or the dataset is too small to have a statistical significance.

TABLE 17

Cross-donor testing result from the monocyte-granulocyte-lymphocyte classifier after data cleaning

| Test donor | Lymphocyte (F1-score) | Monocyte (F1-score) | Granulocyte (F1-score) |
|---|---|---|---|
| 1 | 98.1% | 97.1% | 98.2% |
| 2 | 99.3% | 91.6% | 92.6% |
| 3 | 98.8% | 96.5% | 97.2% |
| 4 | 94.4% | 93.2% | 93.8% |
| 5 | 100% | N/A | N/A |
| 6 | 98.4% | 96.7% | 97.6% |
| Average | 98.2% | 95.0% | 95.9% |

*N/A represents when such data is unavailable, or the dataset is too small to have a statistical significance.

TABLE 18

Cross-donor testing result from the B-T lymphocyte classifier after data cleaning

| Test donor | B lymphocyte (F1-score) | T lymphocyte (F1-score) |
|---|---|---|
| 1 | N/A | 85.6% |
| 2 | 82.5% | 84.2% |
| 3 | 83.2% | 74.7% |
| 4 | N/A | 98.6% |
| 5 | 96.9% | N/A |
| 6 | N/A | 99.0% |
| Average | 87.5% | 88.4% |

*N/A represents when such data is unavailable, or the dataset is too small to have a statistical significance.

TABLE 19

Comparison of AIRFIHA with existing methods on classification accuracy

| Method | Labeling method | Sample type | Cross-validation | Monocyte | Granulocyte | Lymphocyte | | |
|---|---|---|---|---|---|---|---|---|
| Bright and dark field microscope[48] | Fluorescence cytometry | Human | Yes | 96.0% | 96.4% (Neutrophil) 96.3% (Eosinophil) | 96.9% | | |
| Lens-free holography[36] | Fluorescence cytometry | Human | No | 98.4% | 98.5% | 98.7% | | |
| Lens-free holography[64] | Negative Immunomagnetic depletion | Human | No | 91.0% | 92.8% | 85.5% | | |
| Third harmonic generation microscope[65] | Density centrifugation + Scattered light cytometry + Negative fluorescence cytometry | Human | No | 97.5% | 97.5% | 98.0% | | |
| AIRFIHA | Negative Immunomagnetic depletion | Human | No | 94.0% | 95.4% | 97.7% | | |
| AIRFIHA | Negative Immunomagnetic depletion | Human | Yes | 91.6% | 94.3% | 96.4% | | |
| | | | | | | | B lymphocyte | T lymphocyte |
| Bright and dark field microscope[48] | Fluorescence cytometry | Human | Yes | | | | 79.4% | 75.7% |
| Optical diffraction tomography[35] | Fluorescence cytometry | Mice | No | | | | 88.4% | 90.9% |
| AIRFIHA | Negative Immunomagnetic depletion | Human | No | | | | 88.2% | 88.8% |
| AIRFIHA | Negative Immunomagnetic depletion | Human | Yes | | | | 84.1% | 85.9% |
| | | | | | | | CD4 | CD8 |
| Optical diffraction tomography[35] | Fluorescence cytometry | Mice | No | | | | 85.7% | 88.8% |
| AIRFIHA | Negative Immunomagnetic depletion | Human | No | | | | 80.4% | 77.5% |

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLES

Example 1—AIRFIHA System

In this work, the classification of human leukocyte types is achieved using a QPM system and a neural network, as conceptually illustrated in FIGS. 1A-1D. The exact configuration of the QPM system is based on a diffraction phase microscope (DPM)[52,66,67] which can provide highly stable and accurate phase imaging of cells. The imaging resolution of the QPM system is 590 nm, while the field of view is around 61 μm×49 μm. Compared with optical diffraction tomography[35,49], QPM does not necessitate a complex imaging system and expensive computation requiring a large amount of data, and the system is relatively cost-effective with a smaller footprint. To get the data set for the neural network to learn from, the leukocyte samples were isolated from the fresh blood samples of six healthy donors within 24 hours of blood extraction. The blood sample used for the leukocyte separation for each donor was in 1-3 ml range, depending on the minimum volume requirement as per manufacturer's instruction for the leukocyte subpopulations. To minimize the influence of labelling on cell activity, the leukocytes were negatively isolated by using antibody labeled magnetic particles as illustrated in FIG. 1A. All the cells, other than the target cells, will combine with the magnetic particles to split from the whole blood, thus leaving the residuals as the target cells. Then, the isolated sample was diluted in PBS (phosphate buffer saline) and mounted between two glass coverslips before placing it onto a home-built QPM system as illustrated in FIG. 1B. Phase images of each leukocyte type were retrieved from the measured interferograms. Timely measurement and careful treatment ensure that the native nature of leukocyte samples was maintained. After thousands of phase images of labeled leukocytes of different types were measured, all the leukocytes in each phase image were cropped to construct the training and testing dataset[53]. A neural network was constructed, trained, and validated for classifying the leukocytes using the phase image dataset (FIG. 1C). A detailed description of the neural network is provided in the following section (Example 2). Finally, the AIRFIHA system was used to identify leukocyte types of new samples (FIG. 1D).

Example 2—Leukocyte Classification Method

Phase maps of labeled leukocytes of four different types from multiple donors were measured to construct the main dataset, including 857 monocytes, 738 granulocytes, 700 B lymphocytes, and 821 T lymphocytes (i.e., 1521 lymphocytes in total). Additionally, we had a phase map dataset for two subtypes of T lymphocytes, containing 211 CD4 cells and 220 CD8 cells. Representative phase maps for each leukocyte subtype are shown in FIG. 2A. Based on these phase maps, area and dry mass distributions were generated for all the leukocyte types (FIGS. 2B and 2C). Note that cell dry mass quantifying the total protein content in a cell can be precisely determined from the phase map, and it has been well explored for cell phenotyping[17,68]. As shown in FIGS. 2B and 2C, monocytes and granulocytes have similar areas but very different dry masses (p-value <0.001), while they are well separated from all the other lymphocytes (B and T lymphocytes and CD4 and CD8 cells) through both area and dry mass distributions (p-value <0.001). For the main subtypes of lymphocytes, i.e., B and T lymphocytes, they are different in both cell area and dry mass (p-value <0.001), but the differences are small. The subtypes of T lymphocytes, i.e., CD4 and CD8 cells, have similar cell dry mass and slightly different cell area distributions (p-value <0.001).

Figure 3B:
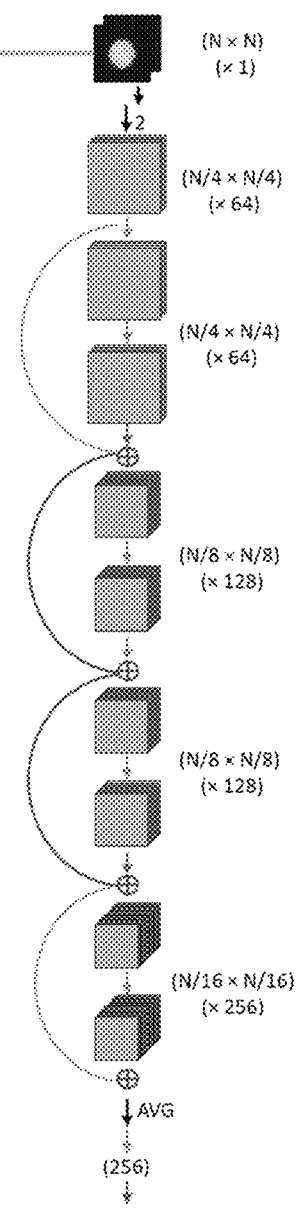
Figure 3C:
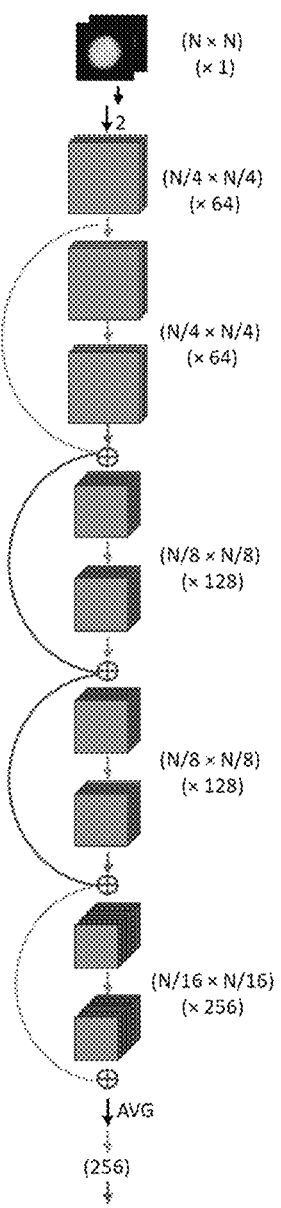

To achieve a higher accuracy in classifying leukocytes (i.e., monocytes, granulocytes, and B and T lymphocytes), we developed a cascaded ResNet structure with a two-step classification design as shown in FIGS. 3A and 3B. This design has been inspired by the prior knowledge of leukocyte hierarchy classification structures[1,2]. The first ResNet (FIG. 3A) is used to classify monocytes, granulocytes, and lymphocytes. The predicted lymphocytes are then put into the second ResNet (FIG. 3B) for further classification into B and T lymphocytes. From this cascaded structure, we can achieve a much higher accuracy in differentiating B and T lymphocytes, compared with a single-step classifier (refer to Tables 1 and 2 for more comprehensive details on the comparison of two individual donors). ResNets of different depths were explored, while the highest validation accuracy was obtained on the ResNet-10 that had around 1.5 million trainable parameters. ResNet-10 has 10 layers, i.e., one input convolution layer, 8 convolution layers from 4 building blocks (each building block has 2 convolution layers), and one final dense layer. The shortcut connects the head and tail of each building block, which helps to restore the crucial shallower features for prediction. The layer size is halved, and the kernel quantity is doubled for every 1, 2, 1 building blocks. Batch normalization (Batch Norm)[56] is applied for each mini-batch after each convolutional layer. Rectified Linear Unit (Relu)[57] is used as the nonlinear activation function. After the last building block, an average pool and a flatten layer are applied to convert each two-dimensional feature map into one value, thus for 256 feature maps, a 256×1 vector is obtained to represent each of the input images. Probabilities of each type are produced based on this feature vector via a dense layer with the Softmax activation function[58]. For the monocyte-granulocyte-lymphocyte classification task, probabilities of these three types are produced, while for B-T lymphocyte classification, two probability values are produced. The type with the largest probability value is used to make the final decision. To explore the differentiation capability of CD4 and CD8 cells, a separate ResNet was trained by fine-tuning the B-T lymphocyte classifier for the new classification task (FIG. 3C). Details on the training and validation of the classification model are provided in the Method section.

Example 3—Classification Results

Figure 4G:
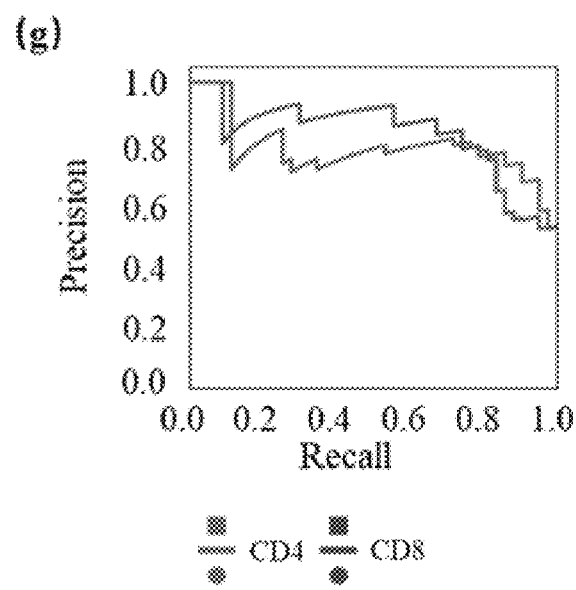

To test the classification capability of the AIRFIHA system, a test set was first constructed by randomly selecting 100 cells from four leukocytes, i.e., monocytes, granulocytes, and B and T lymphocytes. Notably, the test set was not contained in the training set. The classification results were evaluated using recall, precision, and F1 score[69]. F1 score, which is the harmonic mean of recall and precision, is used to characterize the final classification result. The F1 scores from the first classifier for monocytes, granulocytes, and lymphocytes are 94%, 95.4%, and 97.7%, respectively (detailed numerical values for recall, precision, and F1 are provided in Table 3). The F1 scores from the second classifier for B and T lymphocytes are 88.2% and 88.8%, respectively (detailed numerical values for recall, precision, and F1 are provided in Table 4). The overall detection results are summarized and visualized in FIG. 4A and Table 5. The precision-recall curves[70] for each of the classifier in the cascaded-ResNet are plotted and shown in FIGS. 4B and 4C. The values of the area under the precision-recall curve (AUPRC) for lymphocytes, monocytes, and granulocytes in the first classifier are 1.00, 0.98 and 0.98, respectively. The values of AUPRC for B and T lymphocytes in the second classifier are 0.96 and 0.94, respectively. Our B/T cell classification accuracy is comparable with the method based on 3D quantitative phase imaging[35] (note that leukocytes here were from one mice that could make a difference on the accuracy).

Figure 10:
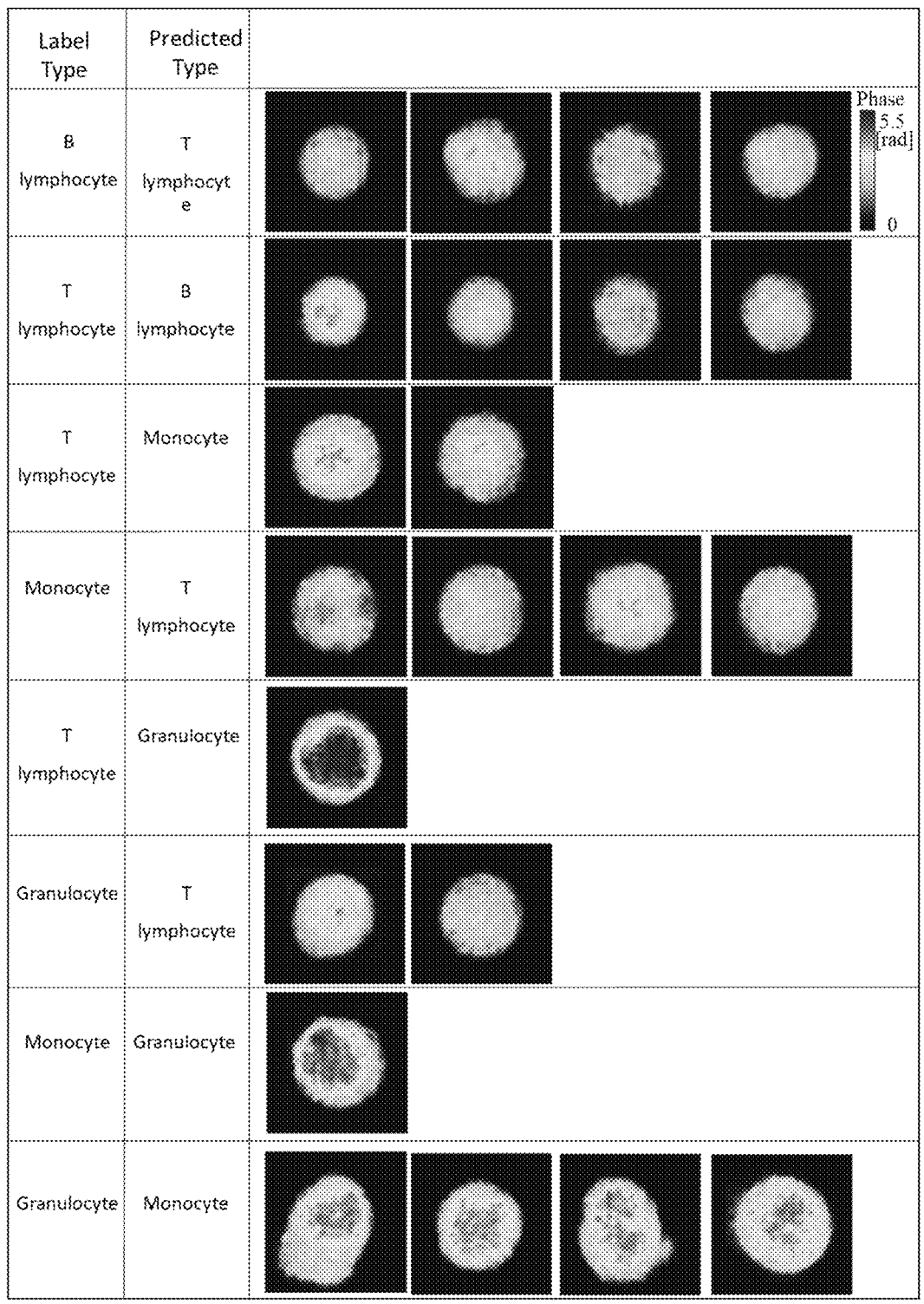
FIG. 10 shows selected examples of misclassified leukocytes.
Figure 11:
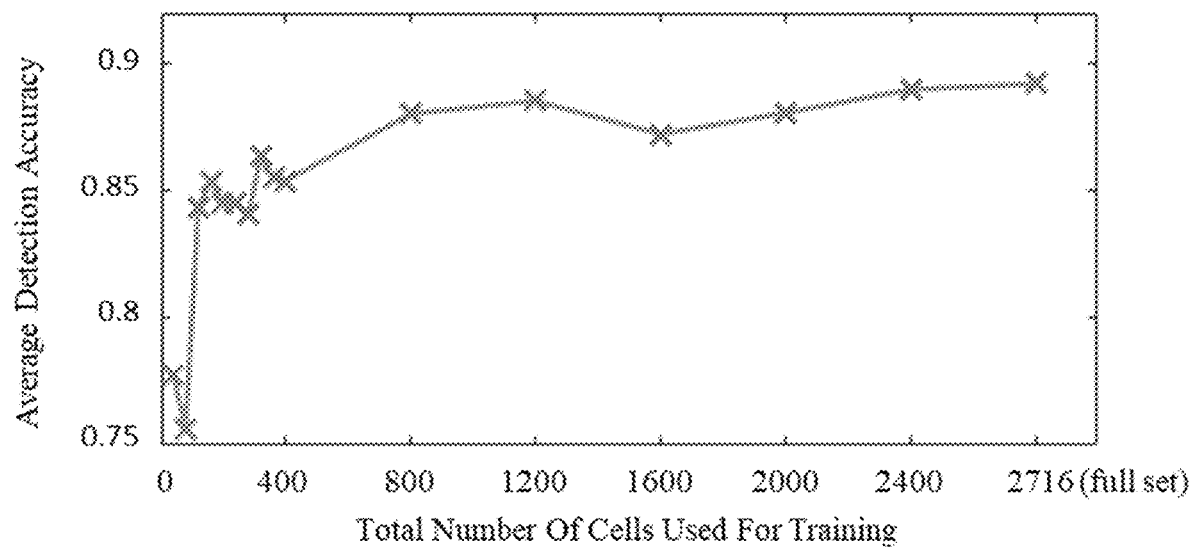
FIG. 11 shows average detection accuracy vs. total number of cells used for training. Each experiment was repeated 5 times to obtain the average detection accuracy.
Figure 12A:
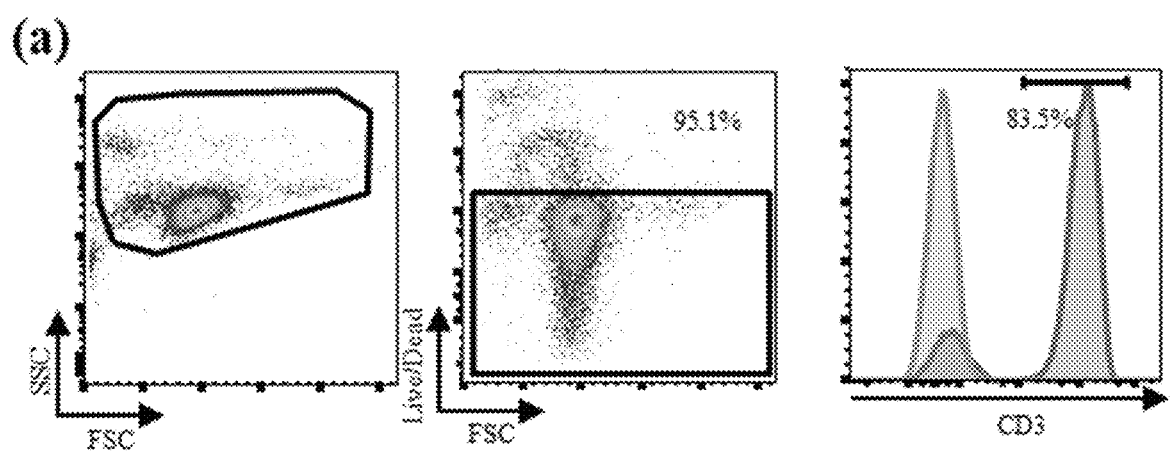
FIGS. 12A-12D shows flow cytometry analysis for the purity of isolated leukocytes showing the polygonal gating for live leukocytes along with the fluorophore-conjugated antibodies for each leukocyte type.
Figure 12B:
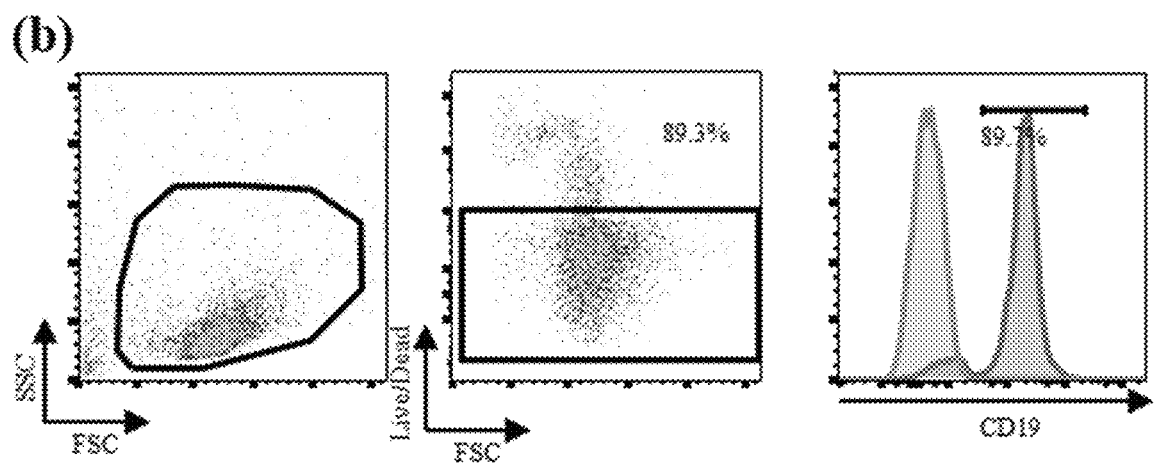
Figure 12C:
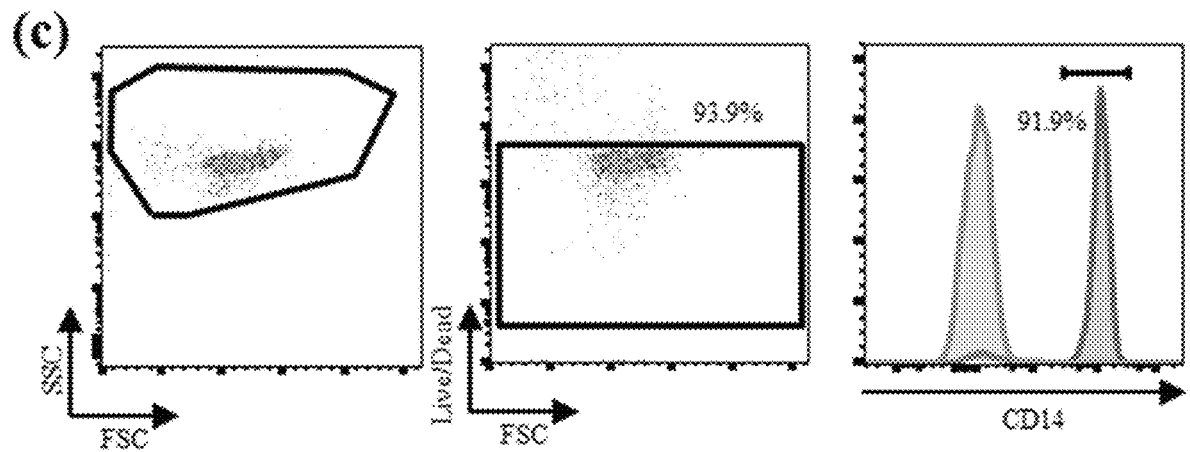
Figure 12D:
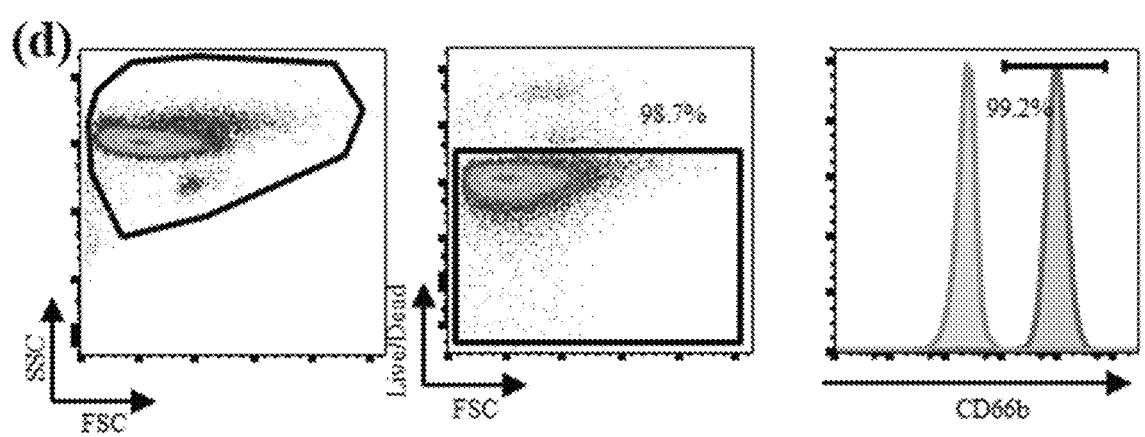

The prediction from the ResNets is based on the feature vectors which are placed at the end of convolutional layers. The model produces similar feature vectors for the same input types and very different feature vectors for different input types. To verify the efficacy of our trained ResNets, the t-distributed stochastic neighbor embedding (t-SNE) method[55] was used, which has decreased the feature dimension from 256 to 3 for all the cell types. The features are plotted in the same coordinate space as shown in FIGS. 4D and 4E. ResNet extracted features could help to distinguish B and T lymphocytes. Compared with principal component analysis (PCA) method, those features have made the boundaries between monocytes, granulocytes, and lymphocytes clearer (FIGS. 8A-8C). As summarized in Table 7, the ResNet method shows increased classification accuracy by over 15% for B and T lymphocytes compared with the PCA method, as evaluated with a trained support vector machine (SVM) classifier. To understand what differences in the cell morphological features contributed to the discrimination in the neural network, we visualized the outputs of each convolutional layer after activation (refer to FIGS. 9A-9D). From the last layers of analyzed leukocytes, we observed that the output features are mainly focused on the nucleus, cytoplasm, and membrane characteristics, elucidating that these cellular features are important in classification. These observations are consistent with the knowledge that subtypes of leukocytes differ in their nuclear, cytoplasmic, and membrane attributes[1,2]. To explore the cause of classification errors, some mistakenly classified cells are listed out. Apart from the morphological similarities between different cell types, the error could be also caused by the mislabeling in the ground truth dataset (FIG. 10). To determine the optimum numbers of cells for achieving a stable and high detection accuracy, we have analyzed the detection accuracy vs. total number of cells used for training (refer to FIG. 11). It is found that the detection accuracy becomes stable when the training dataset is >800 cells (i.e., >200 cells per type). In this study, we have collected a total of ~2,700 cells with >600 cells in each type for training, which was appropriate for achieving a reliable classification result.

Figure 4H:
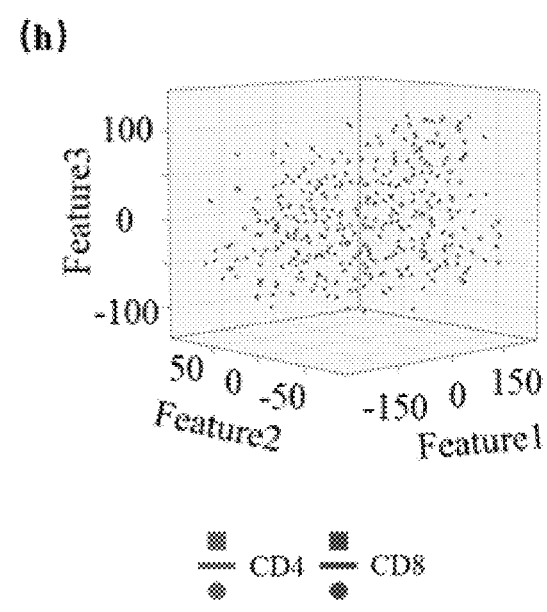

CD4 and CD8 cells are subtypes of T lymphocytes and have very similar morphological features[35]. Routine monitoring of CD4/CD8 cell ratio with point-of-care systems helps monitor immunodeficiency related diseases, e.g., acquired immunodeficiency syndrome (AIDS)[71,72]. The AI-powered platform has the potential to offer a unique approach in which the T cells can be virtually isolated and subtyped while also preserving them for subsequent immunophenotypic analysis. Moreover, such a platform can be expanded to visualize the immunological synapse due to its label-free attributes. We had previously demonstrated the use of QPM in identifying the activation state of CD8 cells in a contrast-free manner[33]. Building up on our previous study, we conjectured that our QPM can be used for differentiating CD4 and CD8 cells in a label-free manner. To test our hypothesis, we employed our AIRFIHA system on CD4 and CD8 cells from the same blood donor for both training and testing. The classification result is summarized in FIGS. 4F-4H. F1-scores of 80.4% and 77.5% for CD4 and CD8 cells are achieved, respectively (detailed values for recall, precision, and F1 scores are provided in Table). Compared with the F1-scores of 85.7% and 88.8% for CD4 and CD8 cells obtained by using 3D refractive maps[35], our preliminary results have a bit lower accuracy. The AUPRC values for CD4 and CD8 cells are 0.78 and 0.84, respectively. Using the t-SNE method, features are extracted from the CD4-CD8 classifier and plotted (FIG. 4I1) for visualizing the differentiation capability. Our preliminary results show that our method has a basic differentiation capability for these two subtypes of T lymphocytes. The accuracy can be increased by using high volume of data and further tuning of our neural network.

Example 4—Cross-Donor and Intra-Donor Validation

Figures 5A, 5B, 5C:
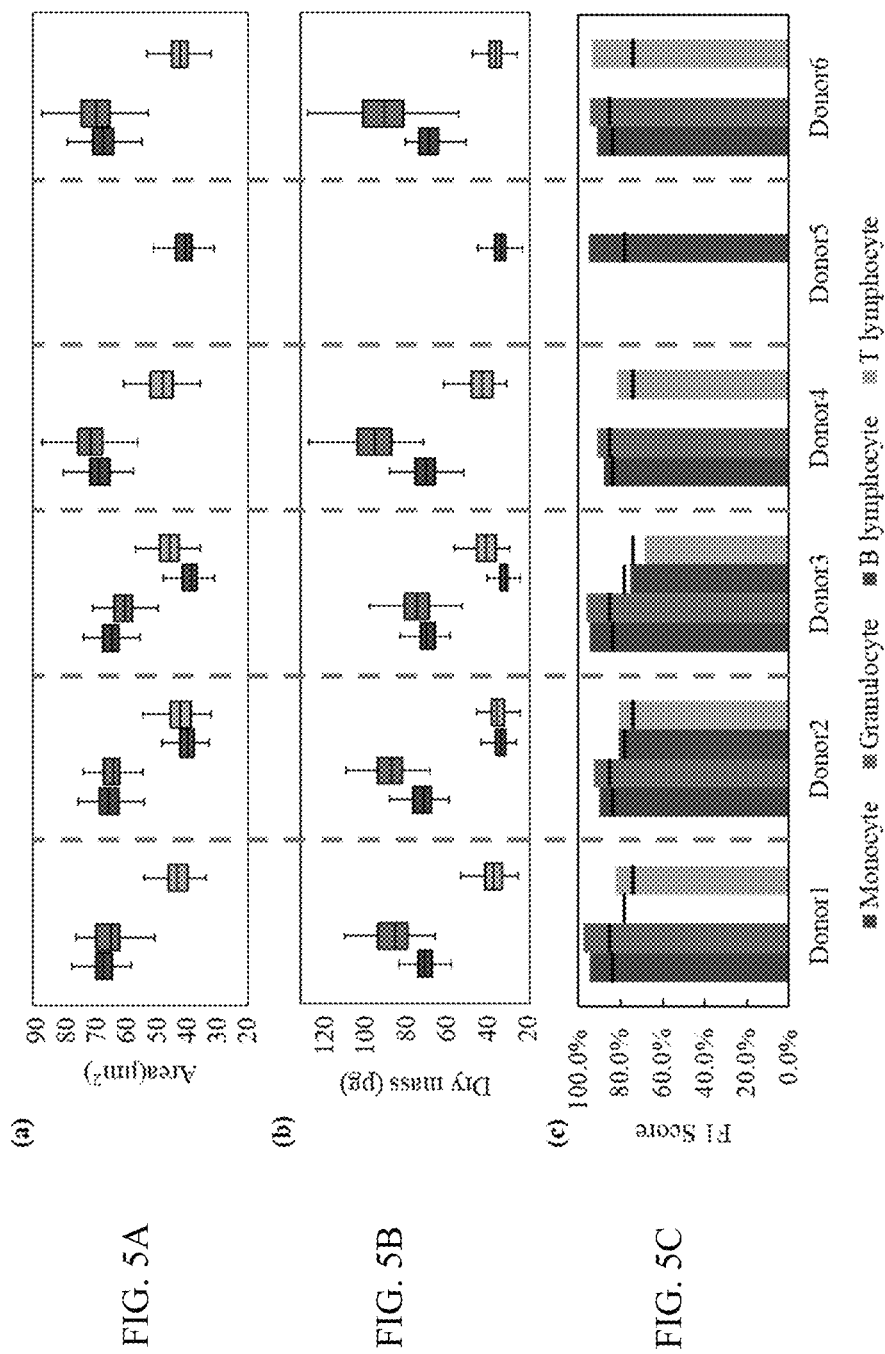
FIGS. 5A to 5C show comparisons of leukocyte area distributions, dry mass distributions, and F1-scores.

As for real clinical applications, the blood test samples normally come from new individuals whose blood samples will not be known by our model. There could be variances in the morphological features of leukocytes of each type between different donors, depending on their age, health status, etc[73,74]. To verify whether such variances exist among our donors, the area and dry mass distributions were plotted for each donor (FIGS. 5A and 5B), from which it was found out that there were indeed distribution differences between donors for certain leukocyte types (note that for several donors the distributions for certain types of leukocytes were missing). Since QPM images were already acquired as a part of another work involving B cell leukemia, the B cells from all the donors were not measured. This partly helped in ensuring that the extraction and subsequent QPM measurement from all the other leukocytes were completed within 3-4 hours of receiving the samples. In any case, there are more than 3 different donors for every leukocytes sample, and this number is sufficient for this investigation. The effect of such differences on the generalization of our model to the new donor was explored. For this purpose, the leukocyte samples from five donors were used for training and the leukocyte samples from the remaining donor was used for testing (>200 cells per type). This experiment was repeated by rotating the testing donor in the same group. The classification result is plotted in FIG. 5C (detailed numerical values are provided in Table 8). The result obtained earlier using all six donors (refer to FIG. 4A) is set as the reference for comparison. As for monocyte and granulocyte, all variances of the 10 tests are less than 0.1. For B lymphocytes only 1 out of 3 tests has variances larger than 0.1, while for T lymphocytes only 1 out of 5 tests has a variance larger than 0.1. The over-all average F1-scores for monocytes, granulocytes, and B and T lymphocytes are 91.6%, 94.3%, 83.7%, and 81.4%, respectively. Notable, the average F1-scores for the B-T lymphocyte classifier of the cascaded-ResNet are 84.1% and 85.9%. This has demonstrated a better accuracy when compared with an earlier work on the classification of B and T lymphocytes, where average F1-scores of 79.4% and 75.7% were obtained, respectively, using bright-field and dark-field imaging cytometry systems[48]. To further understand the feasibility of our method, we also performed intra-donor analysis to reveal the variations among leukocytes within the same donor (refer to the F1-scores summarized in Table 11). The results show that there are variations within the same donor, albeit mostly small on average. The cross-donor and intra-donor validation results have shown that our method has a high potential for clinical applications.

Example 5—Examples of Misclassified Leukocytes

It is important to note that our classification results rely on the accuracy of the separation kits used in this study to select the individual sets of leukocytes. We employed flow cytometry (refer to the details in "Material and Methods") to measure the percentage population of the specific leukocytes after isolating them using the corresponding kits and the representative results from a donor are presented in FIG. 12. These negative isolation kits have inherent inaccuracy that can adversely affect the classification results. However, compared with positive selection kits, negative selection kits could better maintain the original cell morphology for our label-free imaging modality, where the morphological attributes form the basis for classification.

To explore the effect of mislabeled data on the accuracy, we performed data cleaning by removing outliers based on dry mass and area and repeated the above experiments. To perform data cleaning, a leukocyte whose dry mass and area is more than, for example, one standard deviation, two standard deviations, or three standard deviations from the mean of its type is considered as outlier. Data cleaning can also include removing leukocytes that are incorrectly segmented by, for example, removing cells with only half cell bodies and cell clusters. Other methods that can be used to detect the outlier include element 1.5 interquartile ranges above the upper quartile or below the lower quartile, or element more than three scaled median absolute deviation from the median. Data cleaning can occur after producing phase maps for each leukocyte and before network training.

Figure 13:
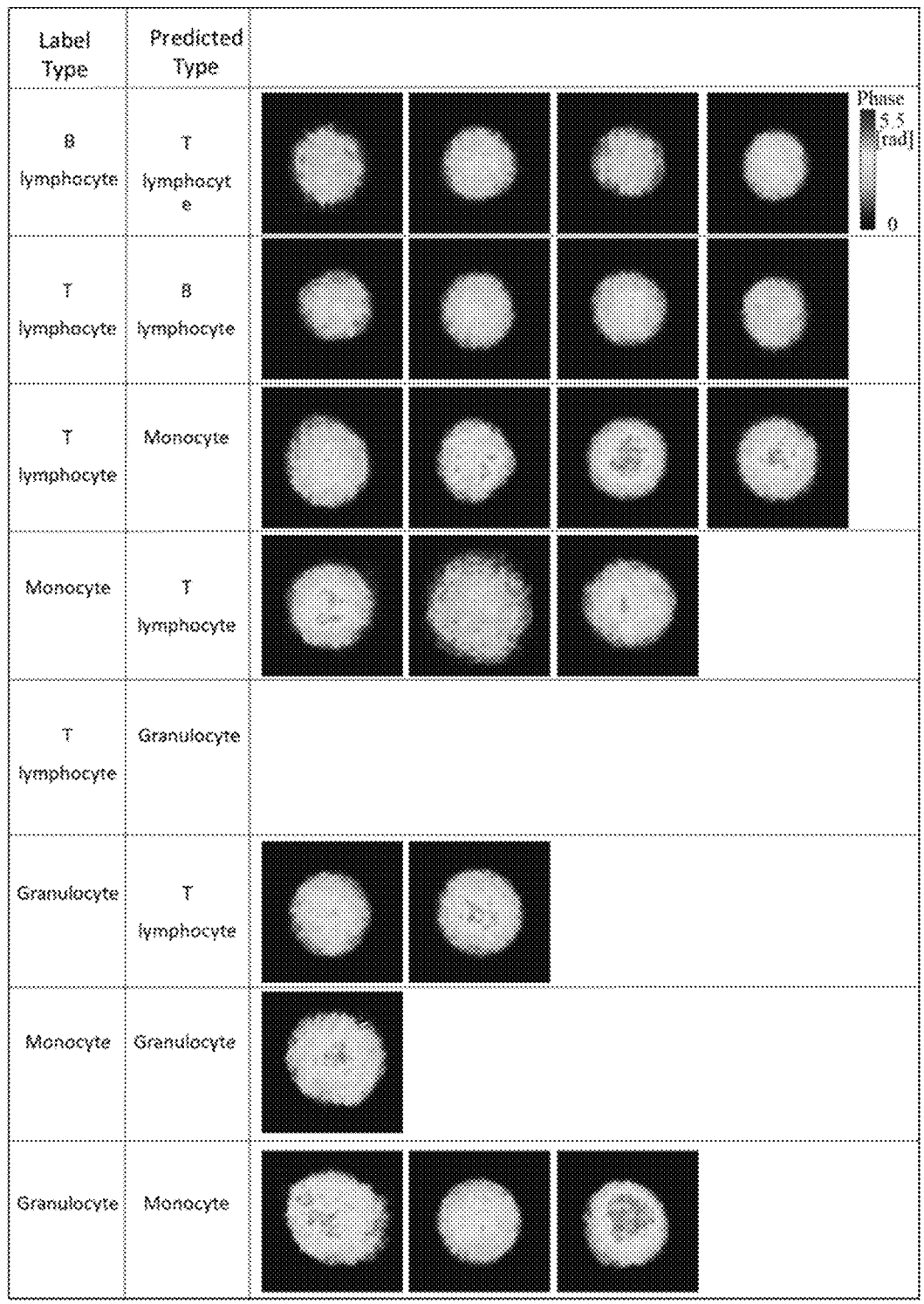
FIG. 13 shows selected examples of misclassified leukocytes after data cleaning.

The results are summarized in Tables 12-18. The accuracy for the experiment with a random chosen test dataset has increase by 2%. And the f1-scores for each type in cross-donor experiment increased by 5% on average. The misclassified samples after data cleaning are shown in FIG. 13. Obviously, the misclassification caused by mislabeling has reduced after data cleaning.

Example 6—Results Evaluation and Further Improvements

We compared our result with other reported results using different detection/imaging principles, labeling methods, and experiment instruments, as shown in Table 19. AIRFIHA has a significantly improved accuracy when compared with the methods based on negative isolated leukocyte classification[64]. To a certain extent, the subject methods benefit from the subtle differences in the refractive index maps of intracellular structure as encoded in the quantitative phase maps. For the classification of monocytes, granulocytes, and lymphocytes, the detection accuracy is slightly lower than the methods using positive fluorescence sorting or complicated purification methods[36,48,65]. It is possible that the negative selection kits have intrinsic lower accuracies in isolating leukocytes when compared with using positive kits, therefore reducing the classification accuracy of the subject methods. If there is a way to sort the leukocytes with higher accuracies without affecting the original morphology states of cells, we expect to further increase the classification accuracy. For the classification of B and T lymphocytes, the subject methods are better than bright and dark field microscopy based methods for the cross-donor validation experiments[48]. The subject methods' classification accuracy is also comparable with 3D QPM based methods that explore expensive and complex instrumentations (note that no human blood test and cross-donor validation have been carried in such methods so far)[35]. Notably, both mentioned methods are based on using positive leukocytes extraction methods. As for the classification of CD4 and CD8 cells, the subject methods' classification accuracy is also compared with that obtained using 3D QPM methods[35].

With the capability to differentiate very complex leukocyte types, AIRFIHA can provide more comprehensive information for potential disease diagnoses with simplified testing procedures. There are still ways to improve the detection accuracy of our system, such as improving the phase imaging resolution through synthetic aperture phase imaging method[75], deconvolution[76], and using 3D-resolved phase maps, preferably captured through a single image acquisition to avoid taking a large amount of data (such method has been recently made possible; a manuscript is under preparation by the authors). The other way to improve accuracy is to expand the dataset and upgrade the neural network model. With these improvements, the generalization capability of our method can also be increased.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1 DOnofrio, G. & Zini, G. in *Morphology of Blood Disorders* (*Second Edition*) Ch. 1 (2015).

2 Bain, B. J. in *Dacie and Lewis Practical Haematology* (*Twelfth Edition*) (eds Bain, B. J., Bates, I., & Laffan, M. A.) Ch. 5 (Elsevier, 2017).

3 Thachil, J. & Bates, I. in *Dacie and Lewis Practical Haematology* (*Twelfth Edition*) (eds Bain, B. J., Bates, I., & Laffan, M. A.) Ch. 23 (Elsevier Health Sciences, 2017).

4 Ciccullo, A. et al. Neutrophil-to-lymphocyte ratio and clinical outcome in COVID-19: a report from the Italian front line. *Int. J. Antimicrob. Agents* 56, 106017 (2020).

5 Liu, J. Y. et al. Neutrophil-to-lymphocyte ratio predicts critical illness patients with 2019 coronavirus disease in the early stage. *J. Transl. Med.* 18, 1-12 (2020).

6 Meintker, L., Ringwald, J., Rauh, M. & Krause, S. W. Comparison of automated differential blood cell counts from Abbott Sapphire, Siemens Advia 120, Beckman Coulter DxH 800, and Sysmex XE-2100 in normal and pathologic samples. *Am. J. Clin. Pathol.* 139, 641-650 (2013).

7 Briggs, C. & Bain, B. J. in *Dacie and Lewis Practical Haematology* (*Twelfth Edition*) (eds Bain, B. J., Bates, I., & Laffan, M. A.) Ch. 3 (Elsevier, 2017).

8 Suzuki, Y. et al. Label-free chemical imaging flow cytometry by high-speed multicolor stimulated Raman scattering. *Proc. Natl. Acad. Sci. U.S.A.* 116, 15842-15848 (2019).

9 Blasi, T. et al. Label-free cell cycle analysis for high-throughput imaging flow cytometry. *Nat. Commun.* 7, 10256 (2016).

10 Ojaghi, A. et al. Label-free hematology analysis using deep-ultraviolet microscopy. *Proc. Natl. Acad. Sci. U.S.A.* 117, 14779-14789 (2020).

11 Kobayashi, H. et al. Label-free detection of cellular drug responses by high-throughput bright-field imaging and machine learning. *Sci. Rep.* 7, 1-9 (2017).

12 Heo, Y. J., Lee, D., Kang, J., Lee, K. & Chung, W. K. Real-time image processing for microscopy-based label-free imaging flow cytometry in a microfluidic chip. *Sci. Rep.* 7, 1-9 (2017).

13 Ramoji, A. et al. Toward a spectroscopic hemogram: Raman spectroscopic differentiation of the two most abundant leukocytes from peripheral blood. *Anal. Chem.* 84, 5335-5342 (2012).

14 Mir, M., Bhaduri, B., Wang, R., Zhu, R. & Popescu, G. in *Progress in Optics* Vol. 57 (ed Wolf, E.) Ch. 3 (Elsevier, 2012).

15 Park, Y., Depeursinge, C. & Popescu, G. Quantitative phase imaging in biomedicine. *Nat. Photonics* 12, 578 (2018).

16 Popescu, G. (eds *Quantitative phase imaging of cells and tissues* (McGraw Hill Professional, 2011).

17 Popescu, G. et al. Optical imaging of cell mass and growth dynamics. *Am. J. Physiol., Cell Physiol.* 295, C538-0544 (2008).

18 Mir, M. et al. Optical measurement of cycle-dependent cell growth. *Proc. Natl. Acad. Sci. U.S.A.* 108, 13124-13129 (2011).

19 Park, Y. et al. Measurement of red blood cell mechanics during morphological changes. *Proc. Natl. Acad. Sci. U.S.A.* 107, 6731-6736 (2010).

20 Popescu, G. et al. Erythrocyte structure and dynamics quantified by Hilbert phase microscopy. *J. Biomed. Opt* 10, 060503 (2005).
21 Li, Y., Di, J., Wu, W., Shang, P. & Zhao, J. Quantitative investigation on morphology and intracellular transport dynamics of migrating cells. *Appl. Opt.* 58, G162-G168 (2019).
22 Lei, C. et al. High-throughput imaging flow cytometry by optofluidic time-stretch microscopy. *Nat. Protoc.* 13, 1603-1631 (2018).
23 Chen, C. L. et al. Deep learning in label-free cell classification. *Sci. Rep.* 6, 21471 (2016).
24 Zhang, J. K., He, Y. R., Sobh, N. & Popescu, G. Label-free colorectal cancer screening using deep learning and spatial light interference microscopy (SLIM). *APL Photonics* 5, 040805 (2020).
25 Jo, Y. et al. Holographic deep learning for rapid optical screening of anthrax spores. *Sci. Adv.* 3, e1700606 (2017).
26 Jo, Y. et al. Quantitative phase imaging and artificial intelligence: a review. *IEEE J. Sel. Top. Quantum Electron.* 25, 1-14 (2018).
27 Strbkova, L., Vesely, P. & Chmelik, R. Classification of Cells in Time-Lapse Quantitative Phase Image by Supervised Machine Learning. In *Digital Holography and Three-Dimensional Imaging* 2019. Th3A.39 (Optical Society of America).
28 Lee, K. C. M. et al. Quantitative Phase Imaging Flow Cytometry for Ultra-Large-Scale Single-Cell Biophysical Phenotyping. *Cytom. A* 95, 510-520 (2019).
29 Nissim, N., Dudaie, M., Barnea, I. & Shaked, N. T. Real-Time Stain-Free Classification of Cancer Cells and Blood Cells Using Interferometric Phase Microscopy and Machine Learning. *Cytom. A,* 24227 (2020).
30 Ozaki, Y. et al. Label-free classification of cells based on supervised machine learning of subcellular structures. *PLoS One* 14, e0211347 (2019).
O'Connor, T., Anand, A., Andemariam, B. & Javidi, B. Deep learning-based cell identification and disease diagnosis using spatio-temporal cellular dynamics in compact digital holographic microscopy. *Biomed. Opt. Express* 11, 4491-4508 (2020).
32 Kim, G., Jo, Y., Cho, H., Min, H.-s. & Park, Y. Learning-based screening of hematologic disorders using quantitative phase imaging of individual red blood cells. *Biosens. Bioelectron.* 123, 69-76 (2019).
33 Karandikar, S. H. et al. Reagent-Free and Rapid Assessment of T Cell Activation State Using Diffraction Phase Microscopy and Deep Learning. *Anal. Chem.* 91, 3405-3411 (2019).
34 Fanous, M., Popescu, G., Tangella, K. & Sobh, N. White blood cell detection, classification and analysis using phase imaging with computational specificity (PICS). In *Proc. SPIE 11653, Quantitative Phase Imaging VII.* 1165311.
35 Yoon, J. et al. Identification of non-activated lymphocytes using three-dimensional refractive index tomography and machine learning. *Sci. Rep.* 7, 6654 (2017).
36 Li, Y. et al. Accurate label-free 3-part leukocyte recognition with single cell lens-free imaging flow cytometry. *Comput. Biol. Med.* 96, 147-156 (2018).
37 Ugele, M. et al. Label-Free High-Throughput Leukemia Detection by Holographic Microscopy. *Adv. Sci.* 5, 1800761 (2018).
38 Ryu, D. et al. Label-free 3-D quantitative phase imaging cytometry with deep learning: identifying naive, memory, and senescent T cells. *J. Immunol.* 204 (2020).
39 Simonyan, K. & Zisserman, A. Very deep convolutional networks for large-scale image recognition. (2015).
40 Szegedy, C. et al. Going deeper with convolutions. In *Proc. 2015 IEEE Conference on Computer Vision and Pattern Recognition.* 1-9.
41 He, K., Zhang, X., Ren, S. & Sun, J. Deep residual learning for image recognition. In *Proc. 2016 IEEE Conference on Computer Vision and Pattern Recognition.* 770-778.
42 He, K., Zhang, X., Ren, S. & Sun, J. Identity mappings in deep residual networks. In *Proc. 2016 European Conference on Computer Vision.* 630-645.
43 Bishop, C. M. (eds) *Pattern recognition and machine learning* (Springer, 2006).
44 Goldberg, D. E. & Holland, J. H. Genetic algorithms and machine learning. *Mach. Learn* 3, 95-99 (1988).
45 Rivenson, Y. et al. PhaseStain: the digital staining of label-free quantitative phase microscopy images using deep learning. *Light Sci. Appl.* 8, 23 (2019).
46 Lee, J. et al. Deep-learning-based label-free segmentation of cell nuclei in time-lapse refractive index tomograms. *IEEE Access* 7, 83449-83460 (2019).
47 Wang, H. et al. Deep learning enables cross-modality super-resolution in fluorescence microscopy. *Nat. Methods* 16, 103-110 (2019).
48 Nassar, M. et al. Label-Free Identification of White Blood Cells Using Machine Learning. *Cytom. A* 95, 836-842 (2019).
49 Habaza, M. et al. Rapid 3D refractive-index imaging of live cells in suspension without labeling using dielectrophoretic cell rotation. *Adv. Sci.* 4, 1600205 (2017).
50 Niu, M. et al. Portable quantitative phase microscope for material metrology and biological imaging. *Photonics Research* 8, 1253-1259 (2020).
51 Wang, Z. et al. Spatial light interference microscopy (SLIM). *Optics express* 19, 1016-1026 (2011).
52 Bhaduri, B. et al. Diffraction phase microscopy: principles and applications in materials and life sciences. *Adv. Opt. Photonics* 6, 57-119 (2014).
53 Jin, D. et al. Large population cell characterization using quantitative phase cytometer. *Cytom. A* 91, 450-459 (2017).
54 Hotelling, H. Analysis of a complex of statistical variables into principal components. *Journal of educational psychology* 24, 417 (1933).
55 Maaten, L. v. d. & Hinton, G. Visualizing data using t-SNE. *J. Mach. Learn. Res.* 9, 2579-2605 (2008).
56 Ioffe, S. & Szegedy, C. Batch normalization: Accelerating deep network training by reducing internal covariate shift. *arXiv preprint arXiv:* 1502.03167 (2015).
57 Nair, V. & Hinton, G. E. Rectified linear units improve restricted boltzmann machines. In *Proceedings of the International Conference on Machine Learning.* 807-814 (ICML).
58 Bridle, J. S. Probabilistic interpretation of feedforward classification network outputs, with relationships to statistical pattern recognition. *Neurocomputing,* 227-236 (1990).
59 Kingma, D. P. & Ba, J. Adam: A method for stochastic optimization. *arXiv preprint arXiv:* 1412.6980 (2014).
60 Robbins, H. & Monro, S. A stochastic approximation method. *The Annals of Mathematical Statistics,* 400-407 (1951).
61 Manageò, S. et al. A reliable Raman-spectroscopy-based approach for diagnosis, classification and follow-up of B-cell acute lymphoblastic leukemia. *Sci. Rep.* 6, 24821 (2016).

62 Niu, M. et al. Portable quantitative phase microscope for material metrology and biological imaging. *Photonics Res.* 8, 1253-1259 (2020).
63 Niu, M. et al. Portable quantitative phase microscope for material metrology and biological imaging. *Photonics Research* 8, 1253 (2020).
64 Ugele, M. et al. Label-free high-throughput leukemia detection by holographic microscopy. *Adv. Sci.* 5, 1800761 (2018).
65 Wu, C.-H. et al. Imaging cytometry of human leukocytes with third harmonic generation microscopy. *Scientific Reports* 6, 37210 (2016).
66 Popescu, G., Ikeda, T., Dasari, R. R. & Feld, M. S. Diffraction phase microscopy for quantifying cell structure and dynamics. *Opt. Lett.* 31, 775-777 (2006).
67 Pandey, R. et al. Integration of diffraction phase microscopy and Raman imaging for label-free morpho-molecular assessment of live cells. *J. Biophotonics* 12, e201800291 (2019).
68 Barer, R. Interference microscopy and mass determination. *Nature* 169, 366-367 (1952).
69 Powers, D. M. W. Evaluation: from precision, recall and F-measure to ROC, informedness, markedness and correlation. *J. Mach. Learn. Technol.* 2, 37-63 (2011).
70 Saito, T. & Rehmsmeier, M. The precision-recall plot is more informative than the ROC plot when evaluating binary classifiers on imbalanced datasets. *PLoS One* 10, e0118432 (2015).
71 Jani, I. V. et al. Effect of point-of-care CD4 cell count tests on retention of patients and rates of antiretroviral therapy initiation in primary health clinics: an observational cohort study. *Lancet* 378, 1572-1579 (2011).
72 Boyle, D. S., Hawkins, K. R., Steele, M. S., Singhal, M. & Cheng, X. Emerging technologies for point-of-care CD4 T-lymphocyte counting. *Trends Biotechnol.* 30, 45-54 (2012).
73 Olsson, J. et al. Age-related change in peripheral blood T-lymphocyte subpopulations and cytomegalovirus infection in the very old: the Swedish longitudinal OCTO immune study. *Mech. Ageing Dev.* 121, 187-201 (2001).
74 Brown, D. et al. Ontogeny of T lymphocytes and intestinal morphological characteristics in neonatal pigs at different ages in the postnatal period. *J. Anim. Sci.* 84, 567-578 (2006).
75 Zheng, G., Horstmeyer, R. & Yang, C. Wide-field, high-resolution Fourier ptychographic microscopy. *Nat. Photonics* 7, 739-745 (2013).
76 Li, J., Luisier, F. & Blu, T. PURE-LET image deconvolution. *IEEE Trans. Image Process.* 27, 92-105 (2017).

We claim:

1. A method of classifying information of leukocytes in a sample, the method comprising:
training a neural network according to parameters derived from digitally observed features of known leukocytes;
obtaining digitally observed features of known leukocytes using data cleaning, whereby outliers values are removed based on dry mass and area;
tuning the neural network as a function of at least one property of a precision-recall curve and F1 score representing leukocyte classifications of the known leukocytes generated by the neural network based on the digitally observed features;
configuring an imaging device with the trained and tuned neural network to generate data of observed leukocytes;
storing the data of observed leukocytes relating to observed leukocytes features; and
classifying the data of observed leukocytes into at least two classes by the trained and tuned neural network based on the observed leukocyte features.

2. The method of claim 1, wherein the neural network is a residual neural network, visual geometry group, inception, AlexNet, fully connected neural network, convolutional neural network, or generative adversarial network (GAN).

3. The method of claim 1, wherein the at least two leukocyte classes are selected from: granulocytes, lymphocytes, monocytes, and subclasses thereof.

4. The method of claim 3, further comprising classifying lymphocytes into at least two subclasses selected from: natural killer cells, B cells, T cells, and subclasses thereof.

5. The method of claim 4, further comprising classifying T cells into at least two subclasses selected from: CD8+ T cells, helper CD4+ T cells, regulatory CD4+ T cells, memory T cells, natural killer T cells, and gamma delta T cells.

6. The method of claim 3, further comprising classifying granulocytes into at least two subclasses selected from: neutrophils, eosinophils, basophils, and mast cells.

7. The method of claim 3, further comprising classifying monocytes into subclasses selected from: dendritic cells and macrophages.

8. The method of claim 1, wherein the trained and tuned neural network is a two-stage neural network.

9. The method of claim 1, wherein the observed features are derived from quantitative phase imaging of the observed leukocytes.

10. The method of claim 9, wherein the quantitative phase imaging is diffraction phase microscopy.

11. The method of claim 1, further comprising generating the precision-recall curve and the F1 score from the known leukocyte types or from the observed leukocytes.

12. The method of claim 1, wherein at least one of the observed features is/are selected from: cell area, cell mass, cell morphology, cell granules, nuclear characteristics, and intracellular protein distributions.

13. The method of claim 1, wherein the neural network comprises 2, 3, or 4 connected networks.

14. A leukocyte classifying system, the system comprising:
a quantitative phase microscope,
a processor,
a memory coupled to the processor, wherein the memory stores computer-readable instructions that, when executed by the process cause the processor to perform operations comprising:
obtaining digitally observed features of known leukocytes using data cleaning, whereby outliers values are removed based on dry mass and area;
identifying a plurality of leukocyte morphologies; and
classifying types of leukocyte by one or more neural network(s) based on the plurality of identified leukocyte morphologies.

15. The method of claim 14, wherein the one or more neural network(s) include a residual neural network, visual geometry group, inception, AlexNet, fully connected neural network, convolutional neural network, or generative adversarial network (GAN).

16. The system of claim 14, wherein the processor further performs operations comprising producing a digital interferogram associated with at least one of target leukocyte.

17. The system of claim 16, wherein the processor further performs operations comprising extracting leukocyte features from the digital interferogram.

18. The system of claim 14, wherein the processor classifies the types of leukocytes according to known classes defined based on known leukocyte morphologies.

19. The system of claim 14, wherein at least one of the leukocyte morphologies is selected from: cell area, cell mass, cell morphology, nucleus characteristics, and intracellular protein distribution.

20. The system of claim 14, wherein the processor is coupled with a classification database storing known leukocyte features correlated with known leukocyte types.

21. The system of claim 20, wherein the known leukocyte types comprise granulocytes, lymphocytes, monocytes, and subclasses thereof.

22. The system of claim 21, wherein the subclasses of lymphocytes are natural killer cells, B cells, T cells, and subclasses thereof.

23. The system of claim 22, wherein the subclasses of T cells are CD8+ T cells, helper CD4+ T cells, regulatory CD4+ T cells, memory T cells, natural killer T cells, and/or gamma delta T cells.

24. The system of claim 21, wherein the subclasses of granulocytes are neutrophils, eosinophils, basophils, and mast cells.

25. The system of claim 21, wherein the subclasses of monocytes are dendritic cells and macrophages.

26. The system of claim 14, wherein the processor classifies the types of leukocytes by a neural network trained according to known leukocyte phase maps.

27. The system of claim 14, wherein the processor classifies the types of leukocytes using a neural network from donors whose leukocytes are not included in the training set.

28. The system of claim 14, wherein the processor classifies the types of leukocytes using a neural network from donors whose leukocytes are included in the training set or from donors whose leukocytes are the only source of the training set.

* * * * *